United States Patent
Brisebois

(10) Patent No.: US 10,764,714 B2
(45) Date of Patent: *Sep. 1, 2020

(54) AUTONOMOUS PULL AND DISPLAY OF LOCATION BASED SERVICE APPLICATIONS BY A MOBILE DEVICE BASED ON CONTEXT OF THE MOBILE DEVICE

(71) Applicant: AT&T Mobility II LLC, Atlanta, GA (US)

(72) Inventor: Arthur Richard Brisebois, Cumming, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,467

(22) Filed: Aug. 5, 2016

(65) Prior Publication Data
US 2016/0345130 A1  Nov. 24, 2016

Related U.S. Application Data

(63) Continuation of application No. 14/012,327, filed on Aug. 28, 2013, now Pat. No. 9,426,629.

(51) Int. Cl.
*H04W 4/02* (2018.01)
*H04W 4/60* (2018.01)
(Continued)

(52) U.S. Cl.
CPC ............ *H04W 4/023* (2013.01); *H04L 41/22* (2013.01); *H04M 1/72525* (2013.01);
(Continued)

(58) Field of Classification Search
CPC ....... H04W 4/023; H04W 4/003; H04W 4/04; H04L 41/22; H04L 67/34; H04M 1/72525; H04M 1/72572; G06F 3/0481
(Continued)

(56) References Cited

U.S. PATENT DOCUMENTS 7,123,924 B2  10/2006  Cuffaro
7,756,534 B2   7/2010  Anupam et al.
(Continued)

OTHER PUBLICATIONS

U.S. Appl. No. 14/012,327, filed Aug. 28, 2013.
(Continued)

*Primary Examiner* — Anthony S Addy
*Assistant Examiner* — Farid Seyedvosoghi
(74) *Attorney, Agent, or Firm* — Amin, Turocy & Watson, LLP

(57) ABSTRACT

A user's experience is enhanced with respect to location based services (LBS) applications that can be employed by a user via a mobile device using techniques described herein. In an aspect, a device is provided that includes a memory to store instructions and a processor, coupled to the memory, that facilitates execution of the instructions to perform various operations. The operations can include determining a context of the device comprising determining a current location of the device, identifying an application of the device that enables a function related to the current location of the device, determining that the application is relevant to a user identity associated with the device based on the context of the device, adapting a set of graphical images for display by the device to comprise a graphical image associated with the application.

20 Claims, 20 Drawing Sheets

(51) Int. Cl.
- *H04W 4/029* (2018.01)
- *H04M 1/725* (2006.01)
- *H04L 12/24* (2006.01)
- *G06F 3/0481* (2013.01)
- *H04L 29/08* (2006.01)

(52) U.S. Cl.
CPC ... *H04M 1/72572* (2013.01); *H04M 1/72583* (2013.01); *H04W 4/027* (2013.01); *H04W 4/029* (2018.02); *H04W 4/60* (2018.02); *G06F 3/04817* (2013.01); *H04L 67/34* (2013.01)

(58) Field of Classification Search
USPC .............. 455/456.3, 41.1, 466, 558; 705/14; 713/189; 707/748
See application file for complete search history.

(56) References Cited

U.S. PATENT DOCUMENTS

| | | | |
|---|---|---|---|
| 7,788,188 | B2 | 8/2010 | Kramer |
| 8,370,062 | B1* | 2/2013 | Starenky ............... H04W 4/025 701/467 |
| 8,402,111 | B2 | 3/2013 | Raleigh |
| 8,442,503 | B2 | 5/2013 | Almodovar Herraiz et al. |
| 9,658,738 | B1* | 5/2017 | Park .................... G06F 3/04817 |
| 2004/0111518 | A1* | 6/2004 | Schuyler ............... H04L 63/102 709/228 |
| 2006/0030333 | A1 | 2/2006 | Ward et al. |
| 2008/0263024 | A1* | 10/2008 | Landschaft ......... G06F 16/9537 |
| 2009/0197620 | A1 | 6/2009 | Choi |
| 2010/0159904 | A1 | 6/2010 | Colligan et al. |
| 2010/0197323 | A1 | 8/2010 | Freeburg et al. |
| 2010/0291907 | A1 | 11/2010 | MacNaughtan et al. |
| 2010/0328154 | A1* | 12/2010 | Kupfer ................... G01S 19/34 342/357.74 |
| 2011/0072492 | A1* | 3/2011 | Mohler ............... G06F 3/04817 726/3 |
| 2011/0202862 | A1* | 8/2011 | Kramer ................. B60K 35/00 715/771 |
| 2012/0005023 | A1 | 1/2012 | Graff |
| 2012/0040665 | A1 | 2/2012 | Liu et al. |
| 2012/0101903 | A1* | 4/2012 | Oh ..................... G06Q 30/0255 705/14.66 |
| 2013/0019192 | A1* | 1/2013 | Itoh ......................... G06F 3/048 715/765 |
| 2013/0174137 | A1* | 7/2013 | Kim .......................... G06F 8/65 717/171 |
| 2013/0179029 | A1* | 7/2013 | Wang .................. H04L 65/4092 701/32.7 |
| 2013/0191397 | A1* | 7/2013 | Avadhanam ...... G06F 16/24578 707/748 |
| 2013/0304559 | A1* | 11/2013 | Stone .................... G06Q 20/06 705/14.33 |
| 2014/0073302 | A1* | 3/2014 | Trethewey ........ H04W 52/0251 455/418 |
| 2014/0171116 | A1* | 6/2014 | LaMarca .......... H04M 1/72522 455/456.3 |

OTHER PUBLICATIONS

Final Office Action dated Nov. 18, 2015 for U.S. Appl. No. 14/012,327, 36 pages.
Office Action dated May 15, 2015 for U.S. Appl. No. 14/012,327, 30 pages.
Notice of Allowance dated Apr. 13, 2016 for U.S. Appl. No. 14/012,327, 28 pages.
Deblauwe et al., "Combining GPS and GSM Cell-ID positioning for Proactive Location-based Services," Fourth Annual International Conference on Mobile and Ubiquitous Systems: Networking & Services, 2007, MobiQuitous 2007, pp. 1-7.
Gerpott, et al. "Adoption of Location-Based Service Offers of Mobile Network Operators," 2010 Ninth International Conference on Mobile Business and 2010 Ninth Global Mobility Roundtable (ICMB-GMR), 2010, pp. 154-160.
Saravanan et al., "Enhancing context-aware services in mobile environment," 2012 International Conference on Emerging Trends in Science, Engineering and Technology (INCOSET), 2012, pp. 39-44.
Steichen et al., "Wireless Collaboration for Context-Aware Services using Mobile Networked Applications," 4th International Conference on Wireless Communications, Networking and Mobile Computing, 2008, pp. 1-9.

* cited by examiner

AUTONOMOUS PULL AND DISPLAY OF LOCATION BASED SERVICE APPLICATIONS BY A MOBILE DEVICE BASED ON CONTEXT OF THE MOBILE DEVICE

RELATED APPLICATION

This patent application is a continuation of, and claims the benefit of priority to, U.S. patent application Ser. No. 14/012,327, filed Aug. 28, 2013, and entitled "AUTONOMOUS PULL AND DISPLAY OF LOCATION BASED SERVICE APPLICATIONS BY A MOBILE DEVICE BASED ON CONTEXT OF THE MOBILE DEVICE," the entirety of which patent application is hereby incorporated by reference herein.

TECHNICAL FIELD

This disclosure relates generally autonomously pulling and displaying location based services applications by a mobile device based on context of the mobile device.

BACKGROUND

Mobile devices, (e.g., smartphones) rarely ship with all necessary applications pre-installed. This is why hundreds of thousands of applications are posted for download from networked applications stores. These applications are numerous and useful (often free) but are also difficult to find and manage. This is especially true for location based services (LBS) shopping applications. Store specific applications can help shoppers with product availability, product information, sales and even in-store navigation. However, manual identification, loading, management, and manipulation of store-specific applications are hassles for which few subscribers have patience.

The above-described background information relating to conventional location based services is merely intended to provide a general overview. Other background information may become further apparent upon review of the following detailed description.

DETAILED DESCRIPTION

Figure 1:
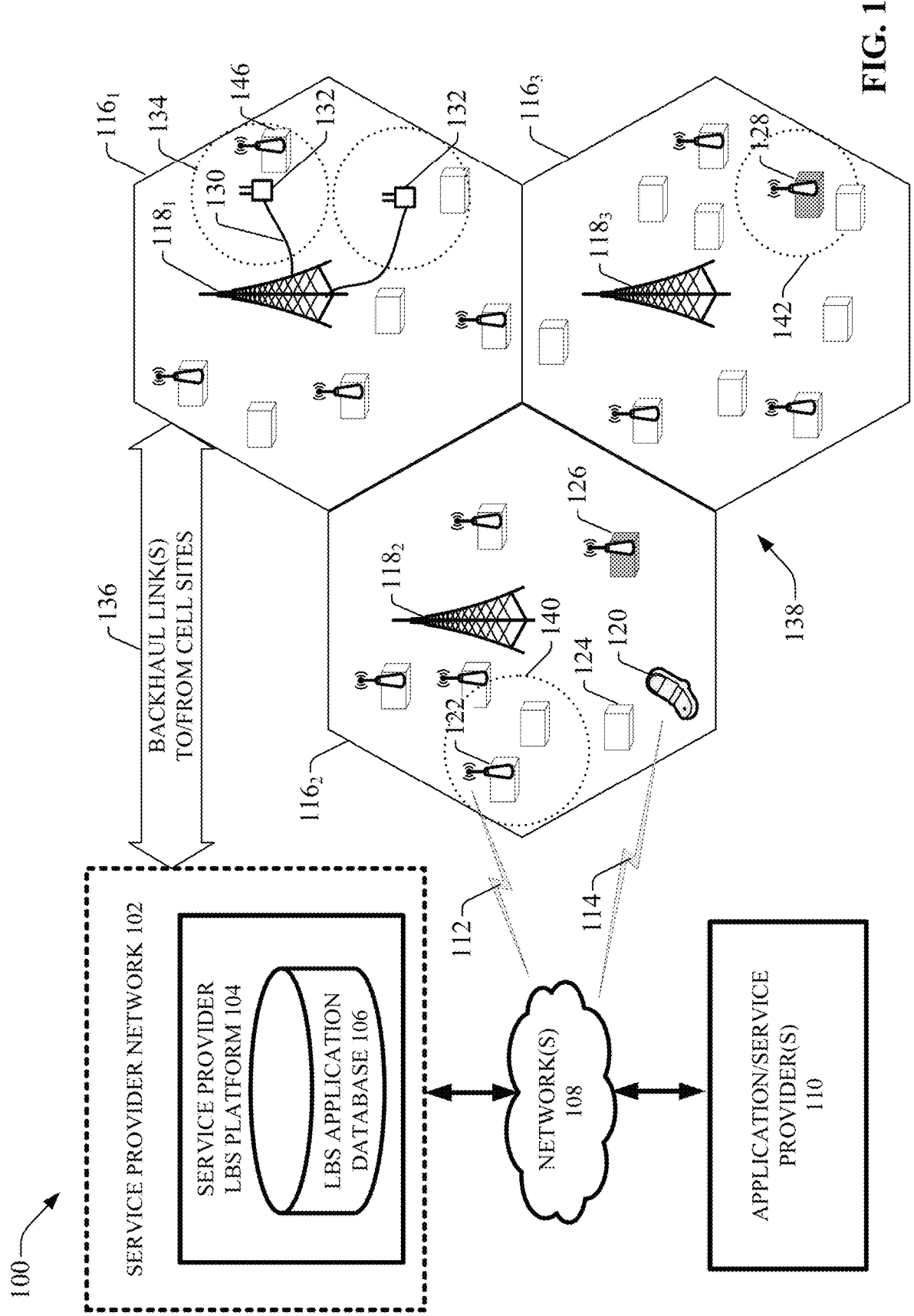
FIG. 1 illustrates a block diagram of an example system for enhancing a user's experience with respect to LBS applications that can be employed by a user via a mobile device in accordance with various aspects and embodiments described herein.

The various embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, the subject matter described in this disclosure generally relates to enhancing a user's experience with respect to LBS applications that can be employed by a user via a mobile device. For example, a system is provided that enables a mobile device to autonomously (e.g., unbeknownst to the user of the mobile device) pull (e.g., download/receive) LBS applications from a networked application provider based on context of the mobile device and/or context of a user of the mobile device, where context can include at least location of the mobile device. In another aspect, the networked application provider can autonomously push (e.g., upload/send) LBS applications to a mobile device based on context of the mobile device and/or user of the mobile device. To further enhance a user's experience with LBS applications provided on the user's mobile device, systems are disclosed that dynamically adapt a home screen display of the mobile device to include graphical image icons for LBS applications that are determined to be relevant to the user's current context.

In an aspect, preparation for efficiently identifying and receiving LBS applications based on device/user context can include establishment of an LBS application data store, e.g., an application database, that can be accessed by a mobile device employed by a user (e.g., via a network or internally). The LBS application database can include information defining coordinate locations for physical stores (or merchants, services, agents etc.) within defined geographic areas and links to applications and website platforms for the respective stores. As a user moves with his or her mobile device within proximity of a store that offers an LBS application, the mobile device can automatically identify the LBS application for the store using the LBS application database and retrieve the LBS application for that store and store it in local memory. Therefore, at a time when the application for the store becomes useful to the user based on the user's context, the application will already be installed on the user's mobile device and ready to go.

In one or more aspects, a device is provided that includes a memory to store executable instructions, and a processor, coupled to the memory, that facilitates execution of the executable instructions to perform various operations. In an aspect, the operations include determining a context of the device comprising determining a current location of the device, identifying an application of the device that enables a function related to the current location of the device, determining that the application is relevant to a user identity associated with the device based on the context of the device, adapting a set of graphical images for display by the device to comprise a graphical image associated with the application.

In another aspect, a method is disclosed that includes determining, by a device comprising a processor, a context of the device including determining a current location of the device, accessing, by the device, a data store having information associating entities with respective location based services applications provided by the entities and respective physical locations of the entities, identifying, by the device, a location based services application in the data store for an entity, of the entities, associated with the current location of the device, and requesting, by the device via a network device, the location based services application from an application management system device in response to the identifying.

Further provided is a tangible or non-transitory computer-readable medium or a computer readable storage device comprising computer-readable instructions that, in response to execution, cause a computing system to perform various operations. These operations can include receiving, via a network device, information regarding a context of a device comprising receiving information regarding a current location of the device, accessing a data store comprising information associating entities with respective location based services applications provided by the entities and respective physical locations of the entities, identifying a location based services application in the data store for an entity associated with the current location of the device; and sending, via the network device, the location based services application to the device in response to the identifying.

Referring now to the drawings, with reference initially to FIG. 1, presented is a diagram of an example system 100 for enhancing a user's experience with respect to LBS applications that can be employed by a user via a mobile device, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes service provider network 102, application/service provider(s) 110, mobile device 120, and wireless network environment 138. System 100 also includes one or more networks 108 and/or backhaul links for connecting mobile device 120, elements of wireless network environment 138, service provider network 102 and/or application service/provider(s) 110. Service provider network 102 includes service provider LBS platform 104 and LBS application database 106. As used herein, the term LBS application refers to a computer software application that enables a function based in part on a location of a device at which the application is executed. In an aspect, service provider LBS platform 104 is configured to facilitate dynamic identification of LBS applications that are relevant or useful to a user of mobile device 120 based on context of the mobile device 120 and/or user of the mobile device 120. Service provider LBS platform 104 is further configured to facilitate automatic reception of the relevant or useful LBS applications at mobile device 120.

For example, LBS application database 106 can include information defining coordinate locations for physical entities (e.g., stores, merchants, buildings, services, agents, devices, etc.) within wireless network environment 138 and links to applications and website platforms associated with the respective physical entities. In an aspect, these applications and/or website platforms can be associated with an application or service provider 110 accessible to service provider LBS platform 104 and mobile device 120 via a network 108. In another aspect, (not shown) one or more of these applications and website platforms can be included or associated with service provider LBS platform 104. As a user of mobile device 120 travels about wireless network environment 138 and comes within proximity of a physical entity (e.g., 122, 124, 126, 128, etc.) associated with an LBS application or website platform defined in LBS application database 106, the mobile device or service provider LBS platform 104 can automatically identify the LBS application for the entity using the LBS application database 106. The mobile device 120 can then automatically pull the LBS application from application/service provider 110 or service provider LBS platform 104 can automatically push the LBS application from application/service provider 110 to mobile device 120.

In an aspect, service provider network 102 includes a wireless network provider, such a cellular service carrier configured to provide wireless communication services to clients in a wireless network environment (e.g., wireless network environment 138). According to this aspect, a user of mobile device 120 can establish a user account with the cellular service carrier and request and authorize the cellular service carrier to provide the various features and functionalities associated with service provider LBS platform 104 (and the like as described herein).

Network(s) 108 can include but is not limited to a cellular network, a wide area network (WAD) (e.g., the Internet), or a local area network (LAN). For example, entity 122 (e.g., a building) that includes a wireless access point can communicate and mobile device 120 can communicate (e.g., as indicated by communication links 112 and 114 respectively) with service provider network 102 and application/service provider(s) 110 using virtually any desired wireless technology, including, for example, cellular, WAN, wireless fidelity (Wi-Fi), Wi-Max, WLAN, and etc. Devices capable of employing system 100, such as mobile device 120 or a wireless access point device provided in wireless network environment 138, can include any suitable computing device configured to communicate with service provider network 102 and/or application/service provider(s) over a network 108. In an aspect, device 120 is mobile device such as a cellular phone or smartphone (e.g., a 3GPP or 4GPP Universal Mobile Telecommunications System (UMTS) phone). Device 120 can further include but is not limited to, an electronic notebook, an electronic pad or tablet, an electronic gaming device, a personal digital assistant (PDA), a laptop computer, a desktop computer or a set-top box, which can operate and communicate in a wireless network environment 138.

In an aspect, mobile device 120 can employ various features and functionalities associated with service provider LBS platform 104 in association with operating in wireless network environment 138. System 100 can employ various cellular technologies. In an aspect, wireless network environment 138 is a long-term evolution (LTE) system. LTE may be said to correspond to Third Generation Partnership Project (3GPP) Release 8 (Rel-8 or R8), Release 9 (Rel-9 or R9), Release 10 (Rel-10 or R10), and possibly beyond R10, while LTE Advanced (LTE-A) may be said to correspond to R10, R11 and possibly also to releases beyond Release 11. LTE-A systems improve spectrum efficiency by utilizing a diverse set of base stations deployed in a heterogeneous network topology. By using a mixture of macro, pico, femto and relay base stations, heterogeneous networks enable flexible and low-cost deployments and provide a uniform broadband user experience.

Wireless network environment 138 includes a number of evolved node Bs (eNBs) and other network entities/elements. An eNB may be a station that communicates with user devices or user equipments (UEs) (e.g., device 120) and may also be referred to as a base station, a node B, an access point, a remote radio device (also referred to as a remote radio head (RRH)), or a similar component rather than a traditional base station. Any such component will be referred to herein as an eNB, but it should be understood that such a component is not necessarily a traditional base station.

Each eNB of wireless network environment 138 can be associated with a unique identifier such as a physical cell identifier (PCI) or service set identifier (SSID). Each eNB of wireless network environment 138 may also provide communication coverage for a particular geographic area. As used herein, the term "cell" refers to the particular geographic coverage area or sector of an eNB and/or an eNB subsystem serving the coverage area, depending on the context in which the term is used. Thus in an aspect, a PCI, SSID or other type of network identifier associated with an eNB can further identify a cell or sector coverage area associated with the eNB. An eNB may provide communication coverage for a macro cell, a pico cell, a femto cell, an RRH cell and/or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. The pico may be connected to the macro cell via a backhaul. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like).

An eNB for a macro cell may be referred to as a macro eNB. An eNB for a pico cell may be referred to as a pico eNB. Similarly, an eNB for a femto cell may be referred to as a femto eNB or a home eNB, and, an eNB for a RRH cell may be referred to as an RRH eNB, or simply as an RRH. An eNB may support one or multiple (e.g., two, three, four, and the like) cells.

Illustrative wireless network environment 138 includes a set of three macro cells $116_1$-$116_3$. It is noted, however, that deployments of coverage macro cells in typical cellular wireless networks range from $10^3$-$10^5$ macro cells. It should be appreciated that the areas or sectors of coverage for each macro cell $116\mu$ ($\mu$=1,2,3) are illustrated as hexagons; however, sectors of coverage of the macro cells $116\mu$ can adopt other geometries generally dictated by a deployment configuration or floor plan, geographic areas to be covered, and so on. In an aspect, each macro cell $116\mu$ can be further sectorized in a $\pi/3$ configuration in which each macro cells includes three sectors. Other sectorizations are possible, and aspects or features of the various embodiments can be exploited regardless of type of sectorization.

In an aspect, wireless network environment 138 can employ (RRHs) connected to macro cell base stations $118\mu$ through fiber backhaul links to extend coverage. For example, macro cell $116_1$ is depicted with two RRHs 132 whose coverage areas constitute respective RRH cells 134 within macro cell $116_1$. It should be appreciated that a macro cell $116\mu$ can include any number N of RRHs 132 dispersed at various locations within the cell. The RRHs 132 are respectively connected to their macro cell base station eNBs $118_1$ with a high speed wired connection, such as a high capacity low latency fiber 130. This wired connection enables fast communications and coordination between the macro cell base station eNB $118_1$ and the RRHs 132 and allows for reliable configurations of the transmissions.

Wireless network environment 138 is further depicted with a plurality of rectangular objects (e.g., 122, 124, 126, and 128) representative of physical entities dispersed throughout the wireless network environment. For example, these physical entities can include buildings, devices or people. In an aspect, some of the physical entities are associated with eNBs (e.g., entities 122, 126 and 124) connected through backhaul links (not shown) to base stations $118\mu$. For example, entity 122 can include a store that has a Wi-Fi access point that establishes a pico cell 140. In another example, entity 126 can represent the home of the user of mobile device 120 with a femto access point that establishes a femto cell 142. In yet another example, entity 128 can represent a workplace of the user of mobile device 120 with another type of wireless access point and associated cell. Physical entities that are associated with eNBs can be associated with a plurality of corresponding coverage cells. For example, entity 146 can include a femto access point that establishes a femto cell within RRH cell 134 and within macro cell $116_1$. In another aspect, physical entities included within wireless network environment 138, such as entity 124 and the like, can included objects, building or devices that are not associated with an eNB.

In an aspect, each macro cell $116\mu$ ($\mu$=1, 2, 3 . . . n) has a cell site (not shown) associated therewith. A cell site comprises a portion of real estate associated with and including base stations $118\mu$ that typically supports one or more antenna for telecommunication (e.g., radio frequency (RF), microwave, and/or satellite dish antennas), and additional sub-systems that include devices that provide, at least in part, wireless coverage and operation of cell site. In aspect, telecommunication is based at least in part on standardized protocols determined by the radio technology utilized for communication. In addition telecommunication can utilize one or more frequency bands, or carriers, which can include substantially all or all EM frequency bands licensed by the service provider (e.g., personal communication services (PCS), advanced wireless services (AWS), general wireless communications service (GWCS), and so forth), and substantially all or all unlicensed frequency bands currently available for telecommunication (e.g., the 2.4 GHz industrial, medical and scientific (IMS) band or one or more of the 5 GHz set of bands).

Cell sites associated with macro cells $116\mu$ are operated at least in part via mobile network platforms (e.g., service provider LBS platform 104) of service provider network 102. In an aspect, service provider network 102 includes mobile network platforms that facilitate circuit switched (CS)-based (e.g., voice and data) and packet-switched (PS) (e.g., internet protocol (IP), frame relay, or asynchronous transfer mode (ATM) . . . ) traffic and signaling generation, and delivery and reception for networked telecommunication in accordance with various radio technologies for disparate markets. In cellular wireless technologies (e.g., 3rd Generation Partnership Project (3GPP) Universal Mobile Telecommunication System (UMTS), Global System for Mobile Communication (GSM)), platforms associated with service provider network 102 are embodied in a core network and a set of radio network controllers. It is noted that service provider network 102 also can integrate disparate mobile networks (e.g., femto network(s), Wi-Fi network(s), femto cell network(s), broadband network(s), service network(s), enterprise network(s) . . . ) in which features or aspects of the various embodiments can be implemented.

In wireless network environment 138, service provider network 102 can functionally connect with cell sites through backhaul link(s) 136 to/from cell sites. In an aspect, backhaul link(s) 136 can include wired link components like T1/E1 or T3/E3 phone lines; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). Each macro cell $116\mu$ facilitates wireless communication between base stations $118\mu$ and mobile devices employing service provider network 102 and deployed in wireless network environment 138 (e.g., mobile device 120 and other types of devices (e.g. fixed devices) configured to transmit and receive radio communications) located therein. Although aspects of system 100 are exemplified with a single mobile device 120, it should be appreciated that such depiction is merely presented for exemplary purposes and that system 100 can include any number N (where N is an integer) of mobile devices.

Figure 2:
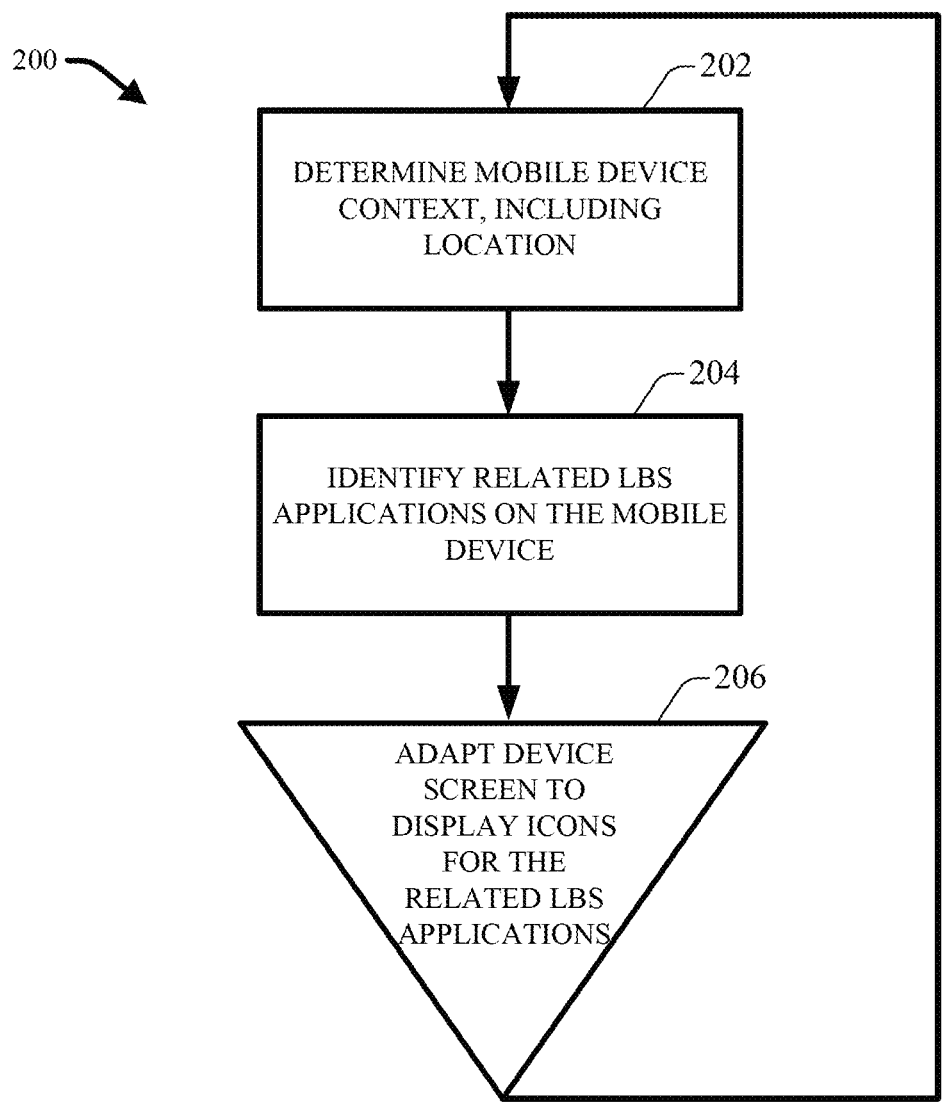
FIG. 2 illustrates flow diagram of an example process for enhancing a user's experience with respect to LBS applications that can be employed by a user via a mobile device in accordance with various aspects and embodiments described herein.

FIG. 2 presents a high level flow diagram of an example process 200 that can be implemented (e.g., by system 100 and the like) to enhance a user's experience with respect to LBS applications that can be employed by a user via a mobile device in accordance with various aspects and embodiments disclosed herein. As discussed in greater detail with respect to FIGS. 4-10, one or more aspects associated with process 200 can be performed by a mobile device (e.g., mobile device 120 of system 100) and/or a service provider LBS platform associated with a service provider network device (e.g., a service provider LBS platform 104). Process 200 is a continuous process that can be performed on a routine basis, a continuous basis, or in response to certain predetermined triggers (e.g., movement of mobile a mobile device associated with process 200, time of day, date in time, etc.).

Process 200 includes determining mobile device/user context, including location of the mobile device, at 202. Context can also include but is not limited to: a mobility state of the mobile device (e.g., as associated with a mobility state of the user such as stationary, driving, walking, etc.), a predicted movement pattern of the mobile device, a point in a known or predicted schedule of a user of the mobile device (e.g., whether the user of the device is at home or work, whether the user of the mobile device is on vacation, whether the user of the mobile device is headed out for lunch, etc.), time of day, date in time, other user devices near the mobile device, a weather condition, a current event associated with location of the device, or a current event having an effect on the user of the mobile device.

After the context of the mobile device is determined, LBS applications that are provided on the mobile device that are related to the mobile device context are identified at 204. For example, a shopping application on the mobile device that provides shopping information relevant to user's who are physically shopping at store "Super Mart" may be useful to the user of the mobile device when the user is located at or near "Super Mart" while the user is stationary. However, the same shopping application most likely will be useless and unsafe when the user is driving past "Super Mart" at a time when the store is closed. In another example, a global positioning system (GPS) based navigation application that facilitates navigation based on mobile device location may be useful to the user of the device when driving but useless when the user is indoors or stationary.

In response to identification of related LBS applications, at 206, the mobile device can adapt configuration of graphical icons displayed on a home screen of the device to include icons representative of the related LBS applications. In an aspect, these icons can be selected to access the respective LBS applications for which they represent.

For example, touch-screen-enabled handheld devices (e.g., smartphones) can perform multiple simple and complex functions within a relatively compact form factor. In most cases the handheld devices can perform many more functions (for example shopping applications) than are possible to display on a single home screen. For instance, a display screen of the mobile device may include limited display real estate that can accommodate only a subset of graphical icons representative of applications provided on the mobile device at a time. Screen size, resolution and user dexterity are among the various factors that limit the number and user-friendliness of application icons (for example) that can fit on a single screen. With this in mind, smartphones typically spread application icons over multiple interface screens a user must scroll through to find a desired application. This makes it hard for users to find and select applications they need: when and where they need them. The arrangement of icons within a screen can also impact their use-ability. For example, an icon that is located on the distant corner from the thumb can be quite difficult to reach, especially for smartphones with larger displays in smaller hands. Small icons may be easy to use when stationary but difficult to see and select from a moving vehicle. It is possible for users to manually arrange and reconfigure these icons according to need and ergonomics, but a single home screen configuration rarely meets all conditional needs.

With process 200, a user of the mobile device does not have to hunt through multiple menus or sub-display screen interfaces to find applications relevant to the user's current context. On the contrary, with process 200, intelligence associated with the mobile device automatically finds LBS applications relevant to the user's current context and adapts a primary display screen interface of the device (e.g., the current interface being displayed on the device) to include graphical image icons representative of the related LBS applications. As a result, LBS applications that are relevant to a current device/user context are automatically presented to the user for quick and easy access. In an aspect, the arrangement of the graphical icons representative of the relevant LBS applications can also accommodate user context. For example, the most relevant applications can be arranged at a location of the interface closest to a user's thumb while the least relevant applications can be arranged at a location of the interface farthest from the user's thumb.

After step 206, process 200 can repeat again with step 202. As the context of the mobile device changes, process 200 will result in the dynamic adaptation of the mobile device home screen to present icons for applications most relevant to a current device context. As certain applications become irrelevant to a current context of the mobile device, they can be removed from the home screen display and replaced with more relevant applications.

Figure 3:
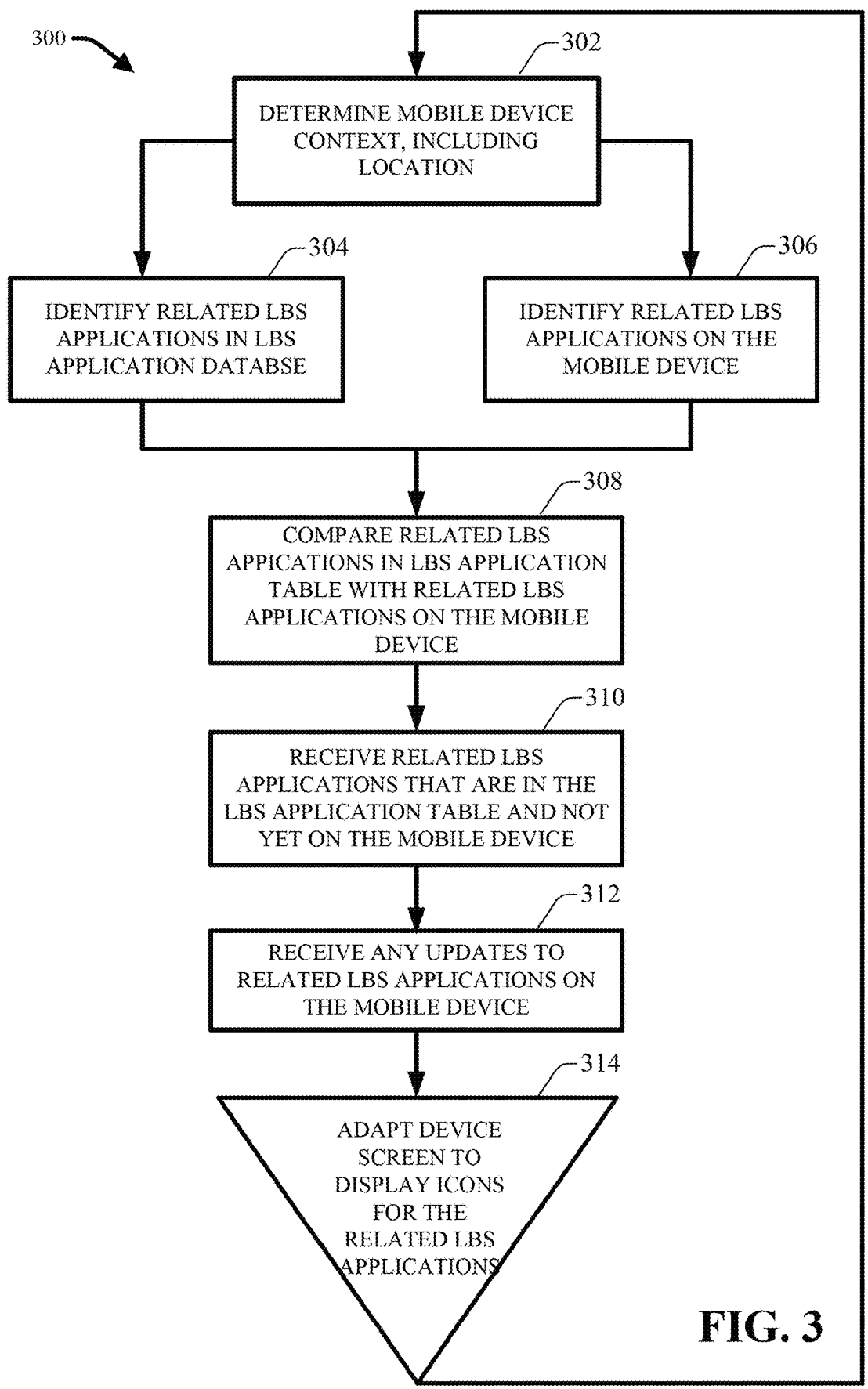
FIG. 3 illustrates flow diagram of another example process for enhancing a user's experience with respect to LBS applications that can be employed by a user via a mobile device in accordance with various aspects and embodiments described herein.

FIG. 3 presents a high level flow diagram of another example process 300 that can be implemented (e.g., by system 100 and the like) to enhance a user's experience with respect to LBS applications that can be employed by a user via a mobile device in accordance with various aspects and embodiments disclosed herein. As discussed in greater detail with respect to FIGS. 4-10, one or more aspects associated with process 300 can be performed by a mobile device (e.g., mobile device 120 of system 100) and/or a service provider LBS platform associated with a service provider network device (e.g., a service provider LBS platform 104). Similar to process 200, process 300 is a continuous process that can be performed on a routine basis, a continuous basis, or in response to certain predetermined triggers (e.g., movement of mobile a mobile device associated with process 200, time of day, date in time, etc.).

Process 300 includes determining mobile device context, including location of the mobile device, at 302. After the context of the mobile device is determined, LBS applications that are provided on the mobile device that are related to the mobile device context are identified at 306 and LBS application that are related to the mobile device context stored in an LBS application database 304 are identified. In an aspect, the LBS application database can include a list of known LBS applications or web platforms associated with entities at known locations. Therefore the act of identifying an LBS application related to device context at 304 can include identifying an LBS application or web platform for an entity associated with the current location of the mobile device. In response to identification of related LBS applications, at 308, the related LBS applications found in LBS application database and the related LBS applications already provided on the mobile device are compared. Then at 310, the mobile device can receive related LBS applications that are included in the LBS application database and not yet provided on the mobile device. In an aspect, the mobile device receives the related LBS applications not yet provided on the device by pulling them from an application/service provider, (e.g., application/service provider 110), via a network. In another aspect, the mobile device receives the related LBS applications not yet provided on the device in response to pushing of the applications to the mobile device by a service provider LBS platform (e.g., service provider LBS platform 104).

For example, mobile devices, (e.g., smartphones) rarely ship with all necessary applications pre-installed. This is why hundreds of thousands of applications are posted for download from networked applications stores. These applications are numerous and useful (often free) but are also difficult to find and manage. This is especially true for LBS shopping applications. Store specific applications can help shoppers with product availability, product information, sales and even in-store navigation. However, manual loading, management, and manipulation of store-specific applications is a hassle few subscribers have patience for.

With process 300, LBS applications relevant to a user's current context can be identified, downloaded and provided to the user at the user's mobile device automatically (e.g., without user involvement), eliminating the hassle associated with manual identification, loading, and management of LBS applications. In addition, LBS applications useful and relevant to a user's current context that that the user may not have known existed can be automatically downloaded and presented to the user. Further, entities associated with the LBS applications (e.g., a store associated with an LBS shopping application) will benefit by automatically reaching users that the entities may not have reached via the LBS applications associated with the respective entities (e.g., because the users didn't know about LBS application for the entities or because the users did not go through the hassle of manually finding and downloading the LBS applications) at a time when the LBS applications are relevant to the users.

Continuing with process 300, at 312, the mobile device can receive any updates to related LBS applications now provided on the mobile device. Then at 314, the mobile device can adapt the presentation and arrangement of graphical icons displayed on a home screen of the device to include icons representative of the related LBS applications. After step 314, process 300 can repeat again with step 302. As the context of the mobile device changes, process 300 will result in the dynamic reception of LBS applications relevant to a current context of the mobile device, dynamic updates to the relevant LBS applications, and dynamic adaptation of the mobile device home screen to present icons for the relevant LBS applications. As certain applications become irrelevant to a current context of the mobile device, they can be removed from the home screen display and replaced with more relevant applications.

Figure 4:
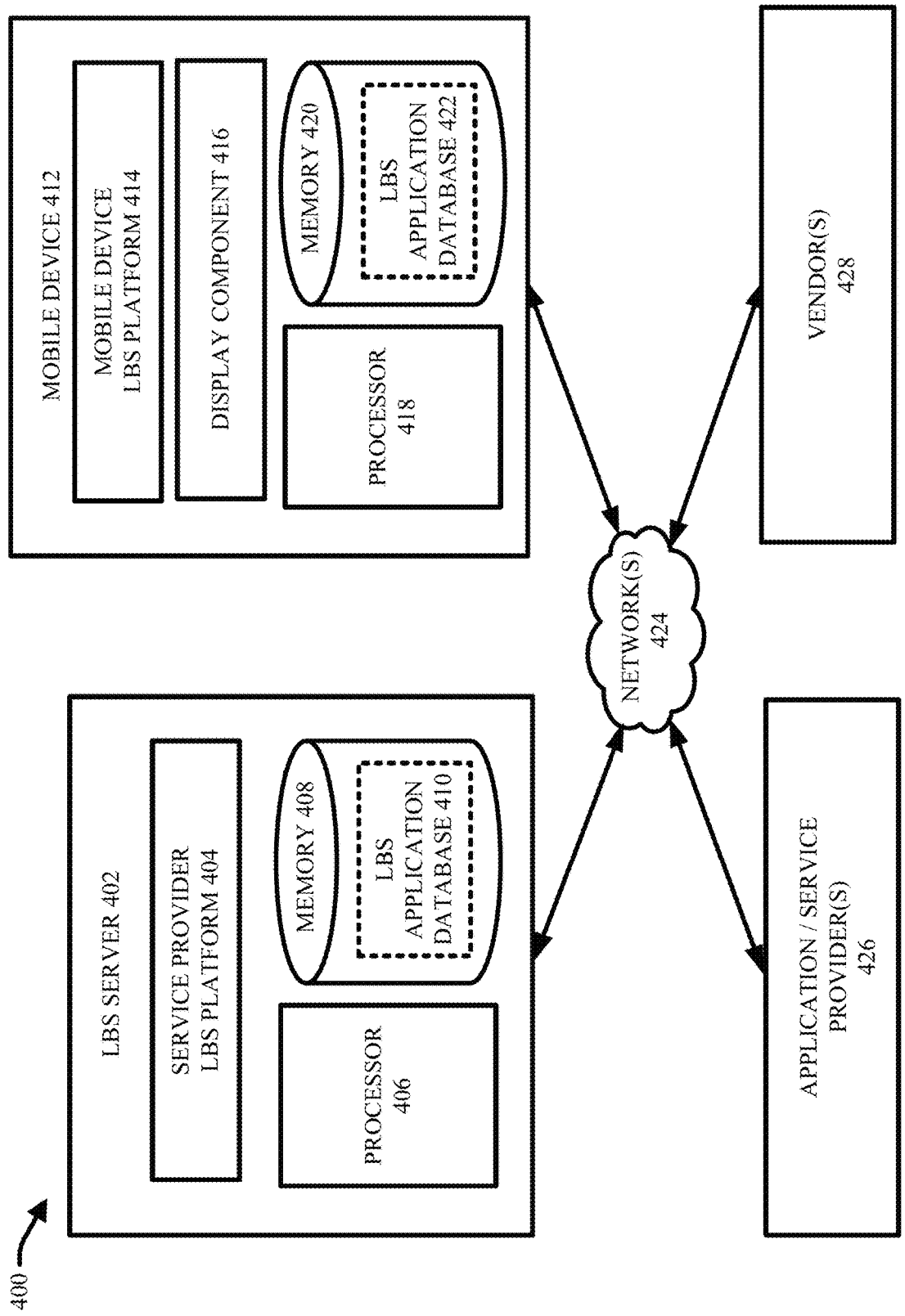
FIG. 4 illustrates a block diagram of another example system for enhancing a user's experience with respect to LBS applications that can be employed by a user via a mobile device in accordance with various aspects and embodiments described herein.

Referring now to FIG. 4, presented is a high level diagram of another example system 400 for enhancing a user's experience with respect to LBS applications that can be employed by a user via a mobile device in accordance with aspects described herein. System 400 includes same or similar features and functionalities as system 100. Repetitive description of like elements employed in respective embodiments of systems and devices described herein are omitted for sake of brevity.

System 400 includes LBS server 402, mobile device 412, application/service providers 426, vendors 428, and one or more networks 424 for connecting the LBS server 402, the mobile device 412, and the application/service providers 426, and vendors 428. Network(s) 424 can include one or more networks discussed with respect to networks 108 (e.g., cellular networks, WAN, the Internet, etc.).

LBS server 402 can include one or more one or more networked devices associated with a service provider network (e.g., service provider network 102), such as a cellular service provider network. LBS server 402 is configured to provide users (e.g., a user of mobile device 412) subscribed to the service provider network an enhanced user experience with LBS applications available to the users via client devices (e.g., mobile device 412) employed by the respective users. For example, LBS server 402 can facilitate automatic identification of LBS applications that are relevant to a current context of mobile device 412 and/or the user of mobile device 412 provided by an application/service provider 426 (e.g., at a networked application store). According to this aspect, service provider LBS platform can receive information related to context of the mobile device 412 and/or user of the mobile device 412 and infer or determine a current context of the mobile device/user of the mobile device 412 based on the information. LBS server 402 can further facilitate automatic delivery of LBS applications to mobile device 412 that are relevant to a current context of the mobile device and/or user of mobile device 412. In addition, LBS server 402 can facilitate automatic updates to applications relevant to the current context of the mobile device 412 and/or user of the mobile device 412 in response to execution of a relevant application at the mobile device 412. The various features and functionalities of service provider LBS platform 404 are discussed in greater detail infra with respect to FIG. 10.

In an aspect, LBS server 402 can include service provider LBS platform 404 to facilitate the various mechanisms noted above for enhancing users experiences with LBS applications available to the users via client devices (e.g., mobile device 412). Service provider LBS platform 404 can include same or similar features and functionalities of service provider LBS platform 104. The various features and functionalities of service provider LBS platform 404 are discussed in greater detail infra with respect to FIG. 10.

LBS server 402 can include memory 408 for storing computer executable components and instructions and processor 406 to facilitate operation of the instructions (e.g., computer executable components and instructions) by the LBS server 402. In an aspect, memory 408 can include LBS application database 410. In other aspects, LBS application database 410 can be remote from LBS server and accessible to LBS server (e.g., via a network 424).

LBS application database 410 can include information defining a plurality of available LBS applications, physical locations respectively associated with one or more of the plurality of LBS applications, and/or information defining where to retrieve each of the plurality of LBS applications (e.g., uniform resource locators (URLs) for each of the plurality of LBS applications). Accordingly, after a location of mobile device 412 is identified, the location can be compared to LBS application database to identify LBS applications associated with the mobile device location. The URL for an LBS application associated with the mobile device location can then be employed to access and/or retrieve the LBS application.

LBS application database 410 can include information relating LBS applications to physical entities located over a wide range of geographic areas. For example, LBS application database 410 can include information relating LBS applications to physical entities spanning around the world, a country, a state, a city, etc. In an aspect, LBS application database 410 can organize information associated with a wireless service environment (e.g., wireless network environment 138) by locations of cells. For instance, the LBS application database 410 can correlate LBS applications to service cells (and the geographic area covered by the respective service cells) that the LBS applications are respectively associated with. For example, an LBS application for a physical shopping store can be correlated to the physical cell having a service area that includes the physical shopping store. In another example, an LBS application for an entity that is not associated with a physical location, such as an online retailer, can be associated with physical cell locations that a user tends to access the LBS application for the online retailer (e.g., a home femto cell). The cells can be identified in LBS application database 410 by a known identifier associated with respective cells, such as a physical cell identifier (PCI) or (service set identification), (e.g., macro cell PCI, Wi-Fi SSID, femto PCI, etc.) and the LBS database can define coordinate locations associated geographical areas serviced by the respective cells.

In an aspect, the LBS application database 410 can be built using commercially available information coupled with propagation analysis for each cell. For example, commercially available information defining physical locations (e.g., addresses, coordinate locations, etc.,) of entities, such as merchant stores (e.g., shopping stores, service stores, restaurants, movie theaters, etc.) associated with LBS applications can be gathered and organized in LBS application database by cell. According to this example, a cell PCI can be associated with a list of all physical entities located within the service area of the cell and specific location information (e.g., an address) for each entity.

In an aspect, LBS application database 410 can include information tailored to specific mobile devices or users of the mobile devices. For example, each subscriber employing LBS server 402 (e.g., via an account with a network service provider) can be associated with a personal account in LBS application database 410. According to this aspect, LBS application database 410 can include information that identifies physical locations related to the user. For example, in association with a user account the LBS application database can define a location of a user's home, a user's workplace, a user's gym location, etc., and any other locations the user visits. Each of these locations can further be associated with LBS applications the user tends to access or is likely to access, at these locations.

In an aspect, LBS server 402 can routinely update LBS application database 410 as new information related to LBS applications, physical locations associated with the respective applications, and information defining where to retrieve and/or access the applications arises. For example, LBS server 402 can update LBS application database when a new LBS application becomes available or when a new store is created for which an LBS application is associated. In another aspect, LBS server 402 can employ machine learning to intelligently correlate certain LBS applications with certain locations visited by a particular user to fine tune a personal LBS application database associated with the particular user over time.

Mobile device 412 can include one or more features and functionalities of mobile device 120. Mobile device 412 can include mobile device LBS platform 414 to facilitate enhancing the experience of a user of mobile device 412 with respect to LBS applications provided on the mobile device 412 and/or LBS applications available to the mobile device 412 from application/service providers 426. Mobile device 412 can include display component 416 for generating a graphical user interface that presents LBS applications at the mobile device. For example, display component 416 can include generate a graphical interface on a liquid crystal display (LCD) screen (or other suitable display screen) of mobile device. The graphical interface can include graphical images representative of applications provided on the mobile device (e.g., thumbnail images, icons, trademarks, etc.).

Mobile device 412 can include memory 420 for storing computer executable components and instructions and processor 418 to facilitate operation of the instructions (e.g., computer executable components and instructions) by the mobile device 412. In an aspect, memory 420 can include LBS application database 422. LBS application database 422 can include same or similar information as LBS application database 410. For example, mobile device 412 can download LBS application database 410 from LBS server and store it in memory 420 as LBS application database 422. In another example, mobile device 412 can download a version or portion of LBS application database 410 from LBS server 402 and store it in memory 420 as LBS application database 422. For example, where LBS application database 410 includes information defining LBS applications and/or web platforms for stores located at a plurality of sectors or cells across a large geographical area (e.g., a state), mobile device 412 can download a portion of the LBS application database 410 pertaining to a local geographic area in which the mobile device is currently operating (e.g., a local city). This downloaded portion of LBS application database 410 can be stored in memory 420 as LBS application database 422. Still in yet another aspect, mobile device 412 does not include LBS application database 422. According to this aspect, mobile device 412 can access LBS application database 410 at LBS server 402 via a network 424.

In an aspect, mobile device LBS platform 414 can determine or infer a context of the mobile device 412 and/or a user of the mobile device 412. Mobile device platform 414 can then identify LBS applications that are relevant to the context of the mobile device 412 and/or user of the mobile device provided on the mobile device 412 (e.g., stored in memory 420). Mobile device LBS platform 414 can also identify LBS applications relevant to the context of the mobile device 412 and/or the user of mobile device 412 that are available to the mobile device 412 from a networked application/service provider 426. For example, mobile device 412 can identify LBS applications listed in LBS application database 410 and/or 422 that are associated with a current location of the mobile device. Mobile device LBS platform 414 can then initiate retrieving (e.g., downloading) the relevant applications from application/service provider 426. The retrieved applications can then be stored in memory 420.

Mobile device LBS platform 414 can further facilitate adapting a user interface of mobile device 412 to display LBS applications relevant to a current context of the mobile device. For example, LBS platform can determine or infer LBS applications that are most relevant to a current context of the mobile device 412 and/or user of the mobile device 412 and cause display component 416 to present graphical images representative of the most relevant applications on a primary display interface of the mobile device 412 (e.g., the current interface being presented to the user of mobile device). As the context of mobile device 412 and/or user of mobile device 412 changes, applications relevant to the context will also change. As a result, graphical images displayed on the primary user interface of mobile device 412 representative of the applications relevant to the context, will also change. Accordingly, mobile device LBS platform facilitates dynamic and automatic adaptation of the primary user interface of mobile device 412 (e.g., a home screen) to include icons representative of LBS applications most relevant to a current context of the mobile device and/or user of the mobile device 412.

In addition, mobile device LBS 414 platform can facilitate automatic updates to LBS applications provided on mobile device 412 based on context of the mobile device. For example, mobile device LBS platform 414 can provide context information collected and/or determined by mobile device LBS platform to LBS server 402 and/or application/service providers 426 via a network 424. LBS server 402 and/or application/service providers 426 can then employ the context information to configure updates for LBS applications accessed on mobile device. The updates can reflect the context of the mobile device and/or the user of the mobile device 412. For example, in response to identification of an LBS shopping application provided on mobile device 412 that is relevant to a current context of mobile device 412 and/or a user of mobile device 412 (e.g., location, mobility state, time, etc.), the relevant LBS application can be automatically presented to a user via display component 416 on a primary interface of mobile device. In addition, a vendor 428 and/or application/service provider associated with the shopping application can become aware of the provision of the LBS application and the context associated with provision of the LBS application and updates the LBS application to reflect the context.

Vendor(s) 428 can include an entity associated with an LBS application. In an aspect, a vendor 428 can include a physical entity, such as merchant (e.g., a store, a restaurant, a sports arena, etc.) or a service provider (e.g., a massage parlor, a tax preparation service, a doctor's office, a law firm, etc.) associated with a network server configured to receive information regarding consumers who access an LBS application for the vendor. A vendor can also include a networked entity such as an online retailer or service provider that employs a server configured to receive information regarding consumers who access an LBS application for the vendor.

With system 400, a user of mobile device 412 can be automatically presented with an LBS application for a vender based on context of the mobile device 412 and/or a user of a mobile device 412. Accordingly, a user of mobile device 412 will accesses the LBS application under a context that makes the LBS application relevant to the user. In an aspect, this intelligence can be employed by a vendor to facilitate providing updates to the LBS application to reflect a current context of the user. In addition, this intelligence can be exploited by a vendor to gather information about user's with respect to user preferences, user habits, user presence and visitation to a physical vendor, and various other information about a users in association with contexts under which the users access an LBS application for the vendor. The vendor can further provide tailored services to the user via the LBS application employed on mobile device 412 that reflects the user's context and preferences.

For instance, a vendor 428, whether physical or virtual, can greatly benefit by knowing information about a user who is coming into contact with the vendor. For example, when a user enters the physical location of a vendor, the vendor can employ information regarding physical presence of the user (e.g., by knowing that the user has arrived), a context of the user, and/or preferences of the user to provide tailored services or information to the user via an LBS application or web platform for the vendor accessed by the user via the user's mobile device 412. Similarly, when a user accesses a virtual vendor, such as an online service provider, the virtual vendor can employ information regarding a context of the user, and/or preferences of the user to provide tailored services or information to the user via an LBS application or web platform for the virtual vendor accessed by the user via the user's mobile device 412.

Accordingly, in an aspect, mobile device 412 and/or LBS server 402 can provide (e.g., via a network 424) information regarding a context of mobile device 412 and/or a user of mobile device 412 to a vender (e.g., a server or network system employed by the vendor 428) in response to the context information being relevant to the vendor. For example, in response to identification, provision, and/or access of an LBS application for a vendor 428, mobile device 412 and/or LBS server can provide the vendor 428 with the context information for the mobile device 412/user of mobile device 412 that resulted in the identification, provision, and/or access of the LBS application. In turn, the vendor 428 can employ the context information to configure updates to the LBS application that reflects the context information. The vendor 428 can then provide the updates to the LBS application as employed on mobile device 412 either directly or via application/service providers 426 and/or LBS server 402.

Figure 5:
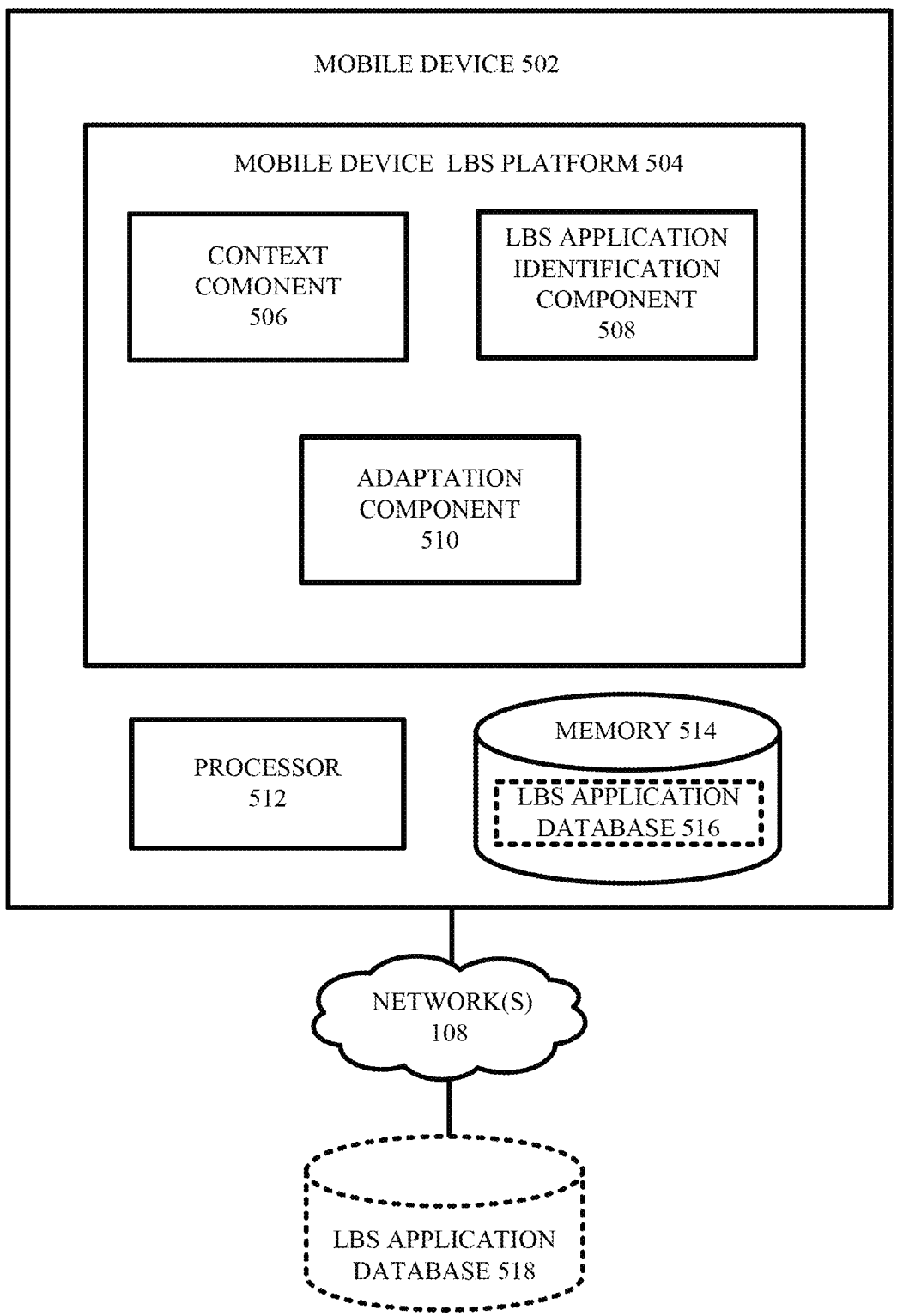
FIG. 5 illustrates an example device for autonomously pulling and displaying LBS applications by a mobile device based on context of the mobile device in accordance with various aspects and embodiments described herein.

FIG. 5 presents a high level diagram of a mobile device 502 configured to pull and display LBS applications based on context of the mobile device in accordance with various aspects and embodiments described herein. Mobile device 502 includes same or similar features and functionalities as device 120 and device 412. Repetitive description of like elements employed in respective embodiments of systems and devices described herein are omitted for sake of brevity.

Mobile device 502 includes mobile device LBS platform 504, processor 512 and memory. Mobile device LBS platform 504 can include context component 506, LBS application identification component 508, and adaptation component 510. Mobile device 502 can include memory 514 for storing computer executable components and instructions and processor 512 to facilitate operation of the instructions (e.g., computer executable components and instructions) by the mobile device 502.

Context component 506 is configured to determine or infer a context of mobile device 502 and/or a user of mobile device 502. Mobile devices such as smartphones or tablet PCs are rarely used under the same conditions. Various LBS applications available to a user via such mobile devices are suitable for use under certain conditions or contexts while unsuitable for use under other conditions. For example, an LBS shopping application that provides shopping information relevant to user's who are physically shopping at store "Super Mart" may be useful to a user who is located at or near "Super Mart" while the user is stationary. However, the same shopping application most likely will be useless and unsafe when the user is driving past "Super Mart" at a time when the store is closed. In another example, a global positioning system (GPS) based navigation application that facilitates navigation based on device location may be useful to a user of the device when driving but useless when the user is indoors or stationary.

Context component 506 can determine or infer a context of mobile device 502 and/or a user of mobile device 502 that can be used to select a context appropriate LBS application for usage by a user of mobile device 502. Context of mobile device 502 and/or user of mobile device 502 can reflect various conditions and combinations of conditions including but not limited to: location of the mobile device, a mobility state of the mobile device (e.g., as associated with a mobility state of the user such as stationary, driving, walking, etc.), a predicted movement pattern of the mobile device, a point in a known or predicted schedule of a user of the mobile device (e.g., whether the user of the device is at home or work, whether the user of the mobile device is away from his hometown, whether the user of the mobile device is headed out for lunch, etc.), time of day, date in time, other user devices near the mobile device, a weather condition, a current event associated with a location of the device, or a current event having an effect on the user of the mobile device.

In an aspect, context component 506 can determine or infer a location of mobile device 502 using various known location detection mechanisms. For example, context component 506 can receive location information from a global positioning system (GPS) employed by mobile device 502 to determine a physical coordinates of the mobile device or an address at which the mobile device is located. In another example, context component 506 can receive location information using an assisted GPS (AGPS) system associated with mobile device 502, a time based locating system associated with mobile device 502, or a multilateration system associated with mobile device 502.

In another aspect, context component 506 can determine or infer mobile device location using information correlating known wireless access point identifiers, radio frequency identification tags, or other identifiers for wireless receiving devices, to location information. For example, context component 506 can access information (e.g., stored in memory 518 or stored at a remote device accessible to context component 506) that relates identifiers for known access points (e.g., PCIs, SSIDs, femto PCIs, etc.) and other radio identifiers (RFID tags, near field communication (NFC) device identifiers Bluetooth™ device identifiers, etc.), to location information.

In an aspect, context component 506 can determine or infer various attributes associated with particular locations to facilitate determining or inferring a current context of mobile device 502 and/or user of mobile device 502. For example, context component 506 can associate information with a location that identifies what physical building or entity is located at a particular location (e.g., a private residence, a store, a restaurant, a movie theater, a bank, a sports arena, a gym, a hair salon, etc.), and information about the physical building or entity (e.g., hours of operation, parking information, type of food sold, etc.).

In addition, context component 506 can associate information with a location that identifies attributes of the location with respect to a particular user of mobile device 502. For example, context component 506 can determine or infer whether the mobile device is at a user's home, office/work, gym, school, etc. based on information associating certain locations with attributes defining the location as the user's home, office/work, gym, school, etc. In another example, context component 506 can determine or infer whether a user is located in an area that is a user's hometown or whether the user is located in an area as a visitor (e.g., on vacation or otherwise) based on information associating a geographic area with a user as the user's hometown. In another example, context component 506 can determine whether a user is a driver or a passenger depending on device pairing with an access point or NFC device in a user's car. For instance, a user can register his mobile device 502 with a Bluetooth™ device in his car. When the mobile device becomes automatically paired with the Bluetooth™ device in the user's car, context component 506 can determine or infer that the user is driving the car.

In an aspect, in order to identify certain attributes associated with a location at which mobile device 502 is located, context component 506 can access information stored in memory 518 or accessible to context component 506 at another device (e.g., via a network), that associates attributes (e.g., type of physical entity at a location, hours of operation of the physical entity, attributes that relate the location to a user such as the user's hometown, home, office, etc.) with locations for a user of mobile device. In another aspect, context component 506 can employ machine learning to generate information that associates attributes with locations. For example, in order to correlate attributes associated with a user of mobile device 502 with certain locations, when context component 506 identifies a new location of mobile device that has not been associated with attributes, context component 506 can request the user provide information about the location. For example, context component 506 can generate a pop-up dialogue box asking the user to confirm whether a certain location is the user's hometown, office, gym, etc.

Context component 506 can also determine or infer a mobility state of mobile device 502 to facilitate determining or inferring a current context of mobile device 502 and/or a user of mobile device 502. A mobility state of mobile device 502 can indicate how fast a user is moving which can correlate to whether a user is stationary, walking, running, driving, flying, and etc. A mobility state of mobile device 502 can also indicate whether a user is accelerating or decelerating and a direction of movement of mobile device 502. For example, context component 506 can analyze a mobility state of mobile device in association with location information to determine whether a user is walking toward or away an office building, or driving toward or away from an office building. In another example, context component 506 can analyze a mobility state of mobile device to learn when a user is stationary and when the user begins to move and how (e.g., walk or drive).

Context component 506 can also use information related to a mobility state of mobile device 502 to predict a movement pattern of the user of mobile device 502 in association with location information and learned user patterns. For example, context component 506 can determine that a user is driving towards a home sector and thus infer that the user is on his or her way home. In another example, context component 506 can determine a direction a user is moving with respect to certain locations to determine if a user is coming or going (e.g., walking into a building or leaving a building). In an aspect, context component 506 can identify three different mobility states of mobile device which include: stationary (e.g., associated with little or no device vibration), walking (e.g., associated with cyclic vibration/movement at a slow pace), and vehicular (e.g., associated with random vibration at a relatively fast pace plus road noise).

Context component 506 can employ various mechanisms to detect a mobility state of mobile device 502. For example, mobile device 502 can include accelerometers that detect movement and speed of mobile device 502 and provide this information to context component 506. In another aspect, mobile device 502 can employ a combination of accelerometers (kinetic generators), GPS and sound to determine a mobility state of mobile device 502. In another aspect, context component can request user input in association with learning or confirming a mobility state of mobile device 502. For example, context component 506 can generate a prompt (e.g., via a dialogue box), that ask a user of mobile device 502 to input information confirming or identifying a mobility state of mobile device 502.

Context of mobile device 502 and/or user of mobile device 502 can further relate to time of day and date in time and attributes associated with time of day and day in time. For example, context component 506 can employ a clock associated with mobile device 502 to determine a time of day and day in time. Context component 506 can correlate time information with business hours operation information to facilitate determining a context of mobile device 502 and/or a user of mobile device 502. For example, context component 506 can determine if a current time is a time when a store is open for business or closed.

Context component 506 can further correlate time information with user activities related to general users (e.g., morning is a time when general users eat breakfast, night is a time when general users sleep, Halloween is a time when general users buy costumes, etc.) and learned activities related to a specific user of mobile device 502 (e.g., work hours, non-work hours, church hours/day, days/hours when children are home from school, etc.) to facilitate determining or inferring context of a user of mobile device 502. In an aspect, context component 506 can also access and analyze a user's calendar entries to learn a user's schedule to facilitate determining a user context a certain point in time. For example, context component 505 can analyze a user's calendar to learn a user's work hours, non-work hours, appointments, holidays, vacations, etc. Context component 506 can also prompt a user (e.g., via a dialogue box), to provide input regarding what activities the user participates in on certain days and at certain times.

In an aspect, context component 506 can determine a current context of a user from a set of a predefined contextual scenarios associated with a particular user of mobile device 502 with respect to location, time and mobility state of mobile device 502. For example, a set of predefined contextual scenarios can include but are not limited to the following: "morning, home, stationary;" "evening, home, stationary;" "weekend, home, stationary;" "work, home, stationary;" "work, office, stationary;" "work, home market, driving;" "work, visiting market, driving;" "non-work, home market, driving;" "non-work, visiting market, driving;" "work, home market, passenger;" "non-work, visiting, market, passenger;" "non-work, home market, walking;" and "non-work, visiting market, walking." It should be appreciated that various conditional attributes/factors related to context of mobile device 502 and/or a user of mobile device 502 are most powerful when used in tandem.

In an aspect, context component 506 is to determine a location of mobile device 502 and locations of entities associated LBS applications as a function of context information excluding a location of mobile device 502. For example, after context component has determined a location of mobile device 502 and its mobility state is stationary, the location aspect of the context mobile device 502 and/or user of mobile device 502 does not change. As a result, LBS applications identified by LBS application identification component 508 related to the location of mobile device will also not change. Accordingly, context component 506 can initiate the turning off locating mechanisms by mobile device 502 (e.g., turn off GPS), to reduce power consumption by mobile device 502 association with GPB detecting mechanisms. In addition, a change in mobility state of mobile device 502 (e.g., from "stationary" or "vehicular" to "walking") can also be used by context component 506 to initiate scanning/measurements (for example using GPS) to determine location and attributes associated with location. This combination allows for accurate location detection: an enabler for location-based services: without the need for constant GPS and associated battery draw. Likewise, context component 506 can determine that it is unnecessary to initiate a GPS measurement for location-based services in association with nearby business if all nearby businesses are closed already (a time-type attribute).

LBS application identification component 508 is configured to identify an LBS application that is fitting for a current location of mobile device 502 and/or a user of mobile device 502. In an aspect, LBS application identification component 508 can employ information relating at least location information with LBS applications to identify an LBS application associated with a current location of mobile device 502. For example, LBS application identification component 508 can access an LBS application database 516 located in memory of mobile device 502 and/or an LBS application database 518 located externally from mobile device (e.g., at LBS server 402) that relates LBS applications available to mobile device and/or provided on mobile device 502 with location information (where LBS application database 516 and 518 can include same or similar features as LBS application databases 410 and 422, respectively). LBS application identification component 508 can then identify an LBS application provided on mobile device 502 (or not provided on mobile device yet available for download by mobile device, as discussed infra with respect to FIG. 7), that matches a current location of mobile device 502 as determined by context component 506.

In addition to merely location, LBS application identification component 508 can further analyze information relating to a current context of mobile device 502 and/or a user of mobile device, as determined or inferred by context component 506, to further identify an LBS application provided on mobile device (or accessible download by mobile device 502) that is suitable and relevant for a usage by a user of mobile device 502 based on the current context of mobile device 502 and/or a user of mobile device 502. According to this aspect, LBS application identification component 508 can employ various algorithms and look-up tables stored in memory 514 relating various known LBS applications and/or LBS application types with contextual information and scenarios contemplated herein (e.g., time, day, mobility type, user schedule, etc.) under which the LBS applications are suitable or relevant for usage. For example, LBS application identification component 508 can identify LBS applications that are appropriate for usage on mobile device based on a mobility state of the mobile device 502, a schedule of a user of mobile device, or a time of operation of a business associated with an LBS application.

For example, LBS application identification component 508 can learn that a user is a home, stationary, and it is the morning of a work day. In addition, context component 506 can infer that at under this context, the user will be heading out to drive to work shortly. Based on this contextual scenario, LBS application identification component 508 can identify a navigational traffic application that provides information relating to current traffic delays and routes to avoid traffic on the route to work. The traffic application can then be provided to the user either under the user's current contextual or in response to the user initiating his drive to work (e.g., as determined by contextual component in response to a change in mobility state and other contextual clues).

In an aspect, LBS application identification component 508 can analyze an LBS application to characterize it as a particular type of application, such as a shopping application, an educational application, a navigation type application, a music based application, a gaming application, a communication application, etc. According to this aspect, LBS application identification component 508 can then employ various algorithms and look up tables that relate certain types of applications with contextual information and scenarios contemplated herein, under which the certain types of LBS applications are suitable or unsuitable for usage. For example, LBS application identification component 508 can determine that an LBS gaming application is not suitable for usage on mobile device 502 when the mobile device located in a classroom setting during school hours. In another example, LBS application identification component 508 can determine that a shopping application for a store located near mobile device 502 is not conducive for usage when mobile device 502 is driving past the store but is conducive for usage when mobile device 502 is stationary or moving at a slow, walking pace and near the store.

In an aspect, LBS application identification component 508 can further identify an LBS application provided on mobile device 502, (and/or accessible to mobile device 502 for download), for providing to a user of mobile device based on preferences and demographics of the user of mobile device 502. For example, LBS application identification component 508 can employ user declared and/or learned (e.g., based on user mobile device application usage history) preferences regarding which LBS applications and/or type of LBS applications the user prefers to employ under certain contexts to further identify a suitable application to present to the user under a given context. For example, when a male and female couple visits a women's clothing store to shop, the female may prefer to employ an LBS shopping application for the store to facilitate her shopping experience at the store. However, her male partner may be completely disinterested in the shopping application for the women's clothing store yet anxious to leave the woman's clothing store to visit the sports memorabilia store across the street. Based on learned user preferences and/or demographic information, LBS application identification component 508 can identify an LBS application for the woman's clothing store on a mobile device (e.g., mobile device 502) for the female partner and an LBS application for the sports memorabilia store on a mobile device for the male partner (e.g., mobile device 502), despite both individuals being located at the woman's clothing store.

Adaptation component 510 is configured to adapt configuration of graphical icons or elements displayed on a primary interface (e.g., an interface currently being viewed by a user of mobile device) of mobile device 502 do include graphical icons representative of LBS applications relevant to a current context of mobile device 502 as determined or inferred by LBS application identification component 508.

Figure 6:
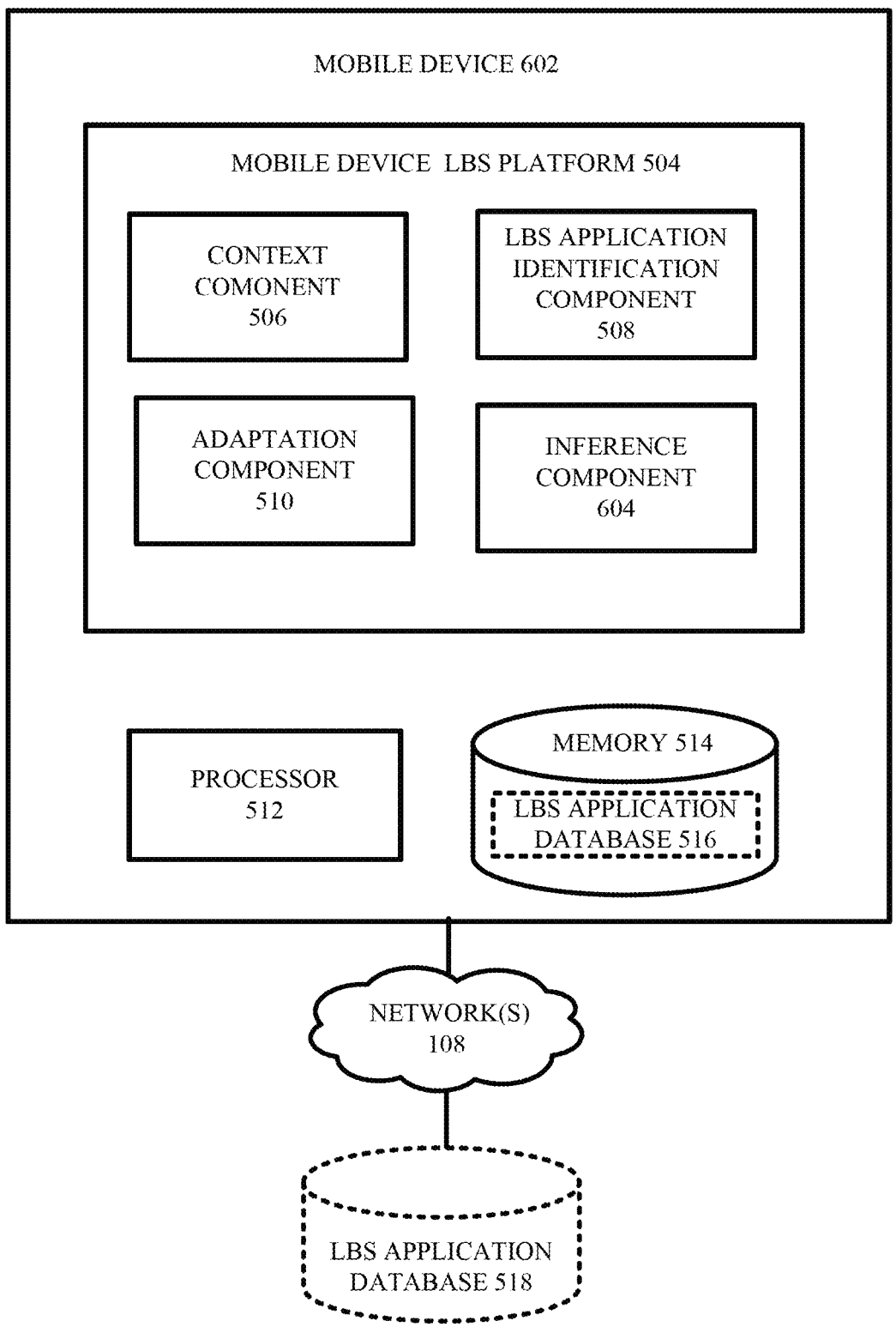
FIG. 6 illustrates another example device for autonomously pulling and displaying LBS applications by a mobile device based on context of the mobile device in accordance with various aspects and embodiments described herein.

FIG. 6 presents another diagram of a mobile device 602 configured to pull and display LBS applications based on context of the mobile device in accordance with various aspects and embodiments described herein. Mobile device 602 includes same or similar features and functionalities as mobile device 502 with the addition of inference component 604. Repetitive description of like elements employed in respective embodiments of systems and devices described herein are omitted for sake of brevity.

Inference component 604 can facilitate making inferences or determinations in connection with various aspects of mobile device LBS platform 504. For example, inference component 604 can employ classifiers that are explicitly trained (e.g., via a generic training data) as well as implicitly trained (e.g., via observing UE behavior, operator preferences, historical information, receiving extrinsic information). For example, inference component 604 can be configured via a learning or training phase within a classifier constructor and feature selection module. Thus, the classifier(s) can be used to automatically learn and perform a number of functions, including but not limited to determining a context of mobile device 602 and/or a user of mobile device 602 and determining one or more LBS applications that are relevant to the context, predicting changes in context of mobile device 602 and/or a user of mobile device 602 and determining one or more LBS applications that are relevant to the change in context, learning a schedule of a user of mobile device 602 and employing the schedule to determine context of a user of mobile device 602, or learning preferences of a user of mobile device and determining one or more LBS applications that are relevant to the preferences.

In order to provide for or aid in the numerous inferences described in this disclosure, inference component 604 can examine the entirety or a subset of data to which it is granted access in order to provide for reasoning about LBS applications that are relevant to context of mobile device and/or a user of mobile device 602. Inference component 604 can be granted access to any information associated with mobile device 602 (and additional devices and systems described herein) as well as extrinsic information accessible to mobile device LBS platform 504 via one or more networks 108.

In an aspect, inference component 604 can perform inferences to identify a specific context or action, or to generate a probability distribution over states, for example. The inferences can be probabilistic—that is, the computation of a probability distribution over states of interest based on a consideration of data and events. An inference can also refer to techniques employed for composing higher-level events from a set of events or data. Such inference can result in construction of new events or actions from a set of observed events or stored event data, whether or not the events are correlated in close temporal proximity, and whether the events and data come from one or several event and data sources. Various classification (explicitly or implicitly trained) schemes or systems (e.g., support vector machines, neural networks, expert systems, Bayesian belief networks, fuzzy logic, data fusion engines, etc.) can be employed in connection with performing automatic or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used in this disclosure also is inclusive of statistical regression that is utilized to develop models of priority.

Figure 7:
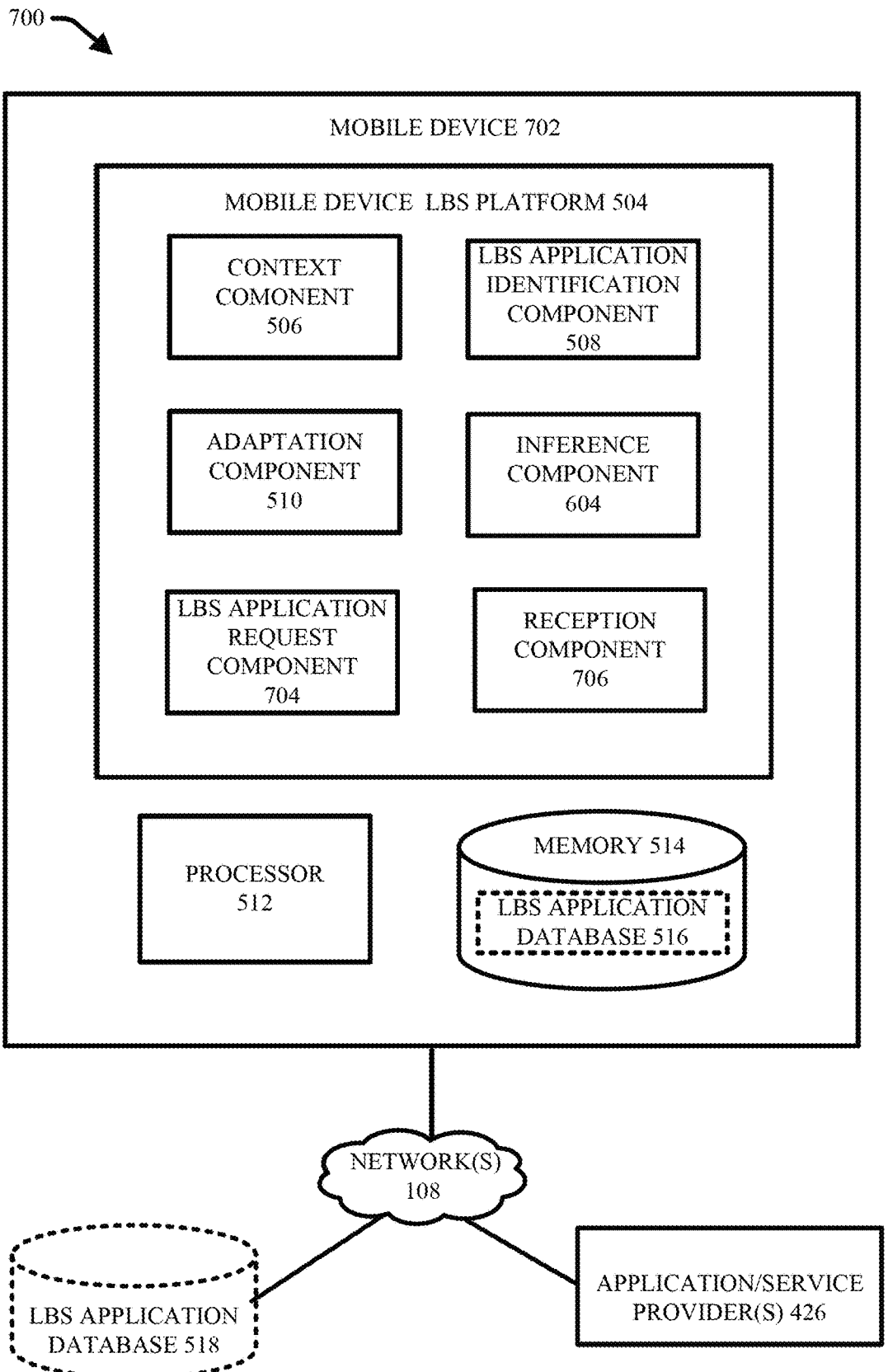
FIG. 7 illustrates another example device for autonomously pulling and displaying LBS applications by a mobile device based on context of the mobile device in accordance with various aspects and embodiments described herein.

FIG. 7 presents another diagram of a mobile device 702 configured to pull and display LBS applications based on context of the mobile device in accordance with various aspects and embodiments described herein. Mobile device 702 includes same or similar features and functionalities as mobile device 602 with the addition of LBS application request component 704 and reception component 706. Repetitive description of like elements employed in respective embodiments of systems and devices described herein are omitted for sake of brevity.

In an aspect, LBS application identification component 508 can identify LBS applications provided on mobile device 702 that are relevant to a current context of mobile device as determined by context component 506. However, in another aspect, LBS application identification component 508 can identify LBS applications that are not yet provided on mobile device 702 that are relevant to a current context of mobile device 702. According to this aspect, LBS application identification component 508 can identify LBS applications stored in LBS application database 516 and/or LBS application database 518 that are relevant to a current context of mobile device 702. In response to identification of a related LBS application in LBS application database 516 and/or 518, mobile device LBS platform 504 can employ LBS application request component 704 to request the identified related application from an application data store or other remote entity providing the application (e.g., application/service provider 426). For example, LBS application identification component 508 can identify information defining a network location (e.g., a URL) of the LBS application using LBS application database 516 and/or LBS application database 518. LBS application request component 704 can then employ the network location information for the application to request and download the related LBS application. Reception component can receive any downloaded LBS applications and store them in memory 514.

Figure 8:
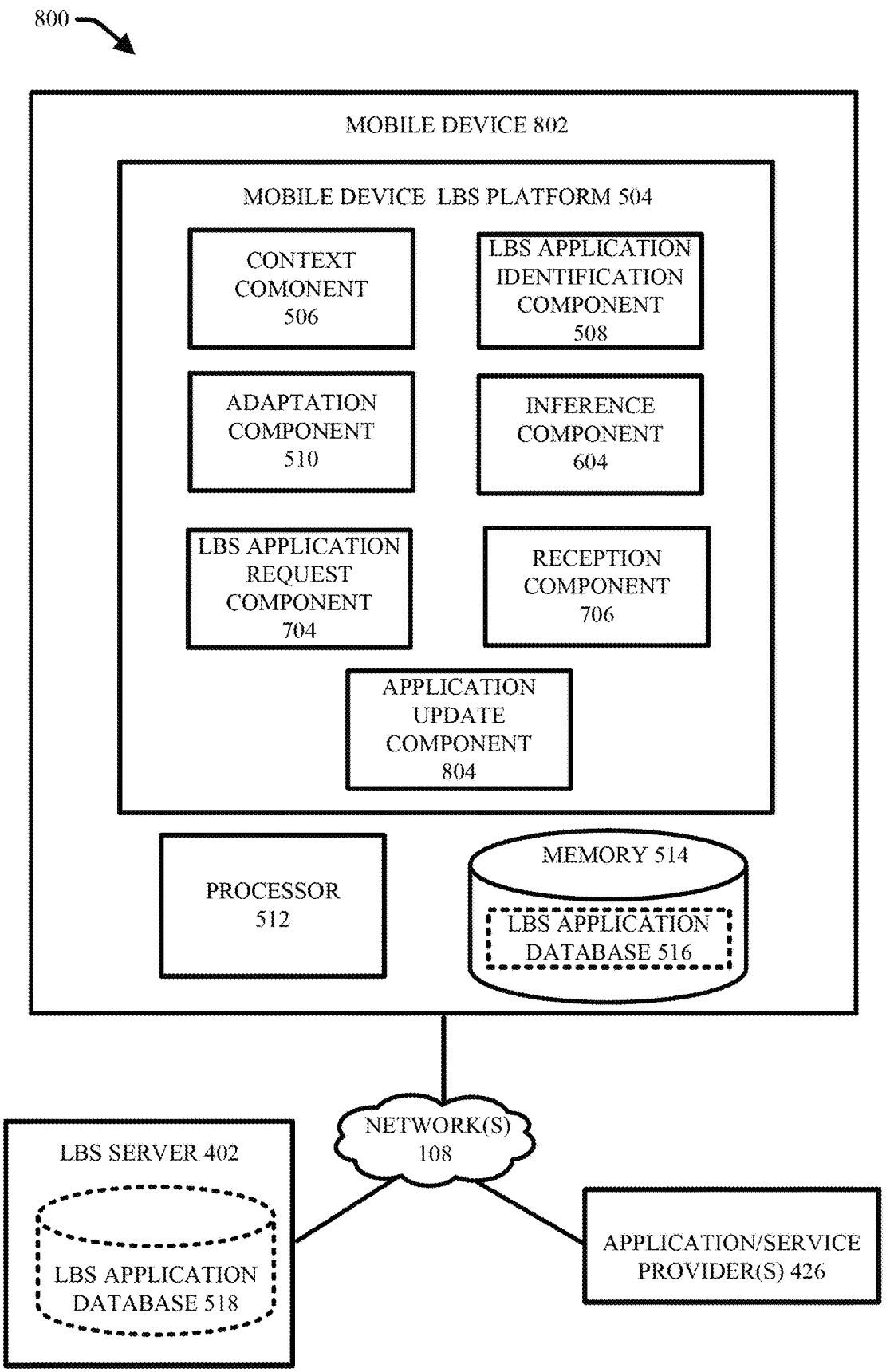
FIG. 8 illustrates another example device for autonomously pulling and displaying LBS applications by a mobile device based on context of the mobile device in accordance with various aspects and embodiments described herein.

FIG. 8 presents another diagram of a mobile device 802 configured to pull and display LBS applications based on context of the mobile device in accordance with various aspects and embodiments described herein. Mobile device 802 includes same or similar features and functionalities as mobile device 702 with the addition of application update component 804. Repetitive description of like elements employed in respective embodiments of systems and devices described herein are omitted for sake of brevity.

Application update component 804 is configured to facilitate updating information provided by an application existing on mobile device 802 when it is accessed to reflect a current context of a user. For example, when a user opens a shopping application for a store when entering the store, the store would benefit from knowing that the user is present, that the user is a returning user, knowing preferences of the user and etc. In addition, the store would benefit by pushing information to a user via the shopping application that is tailored to a user's current context. For example, the store would benefit if it could push daily or weekly specials that are based on a user's context and preferences. For example, the when a user walks into the door of the store associated with the shopping application, the application can present the user with an updated prompt saying "Welcome back User. Last time you purchased cleaning supplies. Today we are having a sale on mops."

Thus in an aspect, application update component 804 can be configured to request updates to LBS applications provided on mobile device 802 in response to access of the LBS application by mobile device 802. In an aspect, application update component 804 can request such updates from LBS server 402 and/or application/service provider 426. The updates can further be received from LBS server 402 and/or application/service provider 426 by reception component 706. The updates can reflect a current context of mobile device 802 and/or a user of mobile device 802 and other information including user preferences. In an aspect, in association with requesting updates to LBS applications, application update component 804 can provide information to LBS server 402 and/or application/service provider 426 determined by context component 506 regarding context of mobile device 802 and/or a user of mobile device. The LBS application server and/or application/service providers 426 can further employ the information to facilitate configuring updates to LBS applications based on the context information. In another aspect, discussed infra with respect to FIG. 10, LBS server 402 can determine a context of mobile device 802 to facilitate configuring updates to LBS applications provided on mobile device 802.

Figure 9:
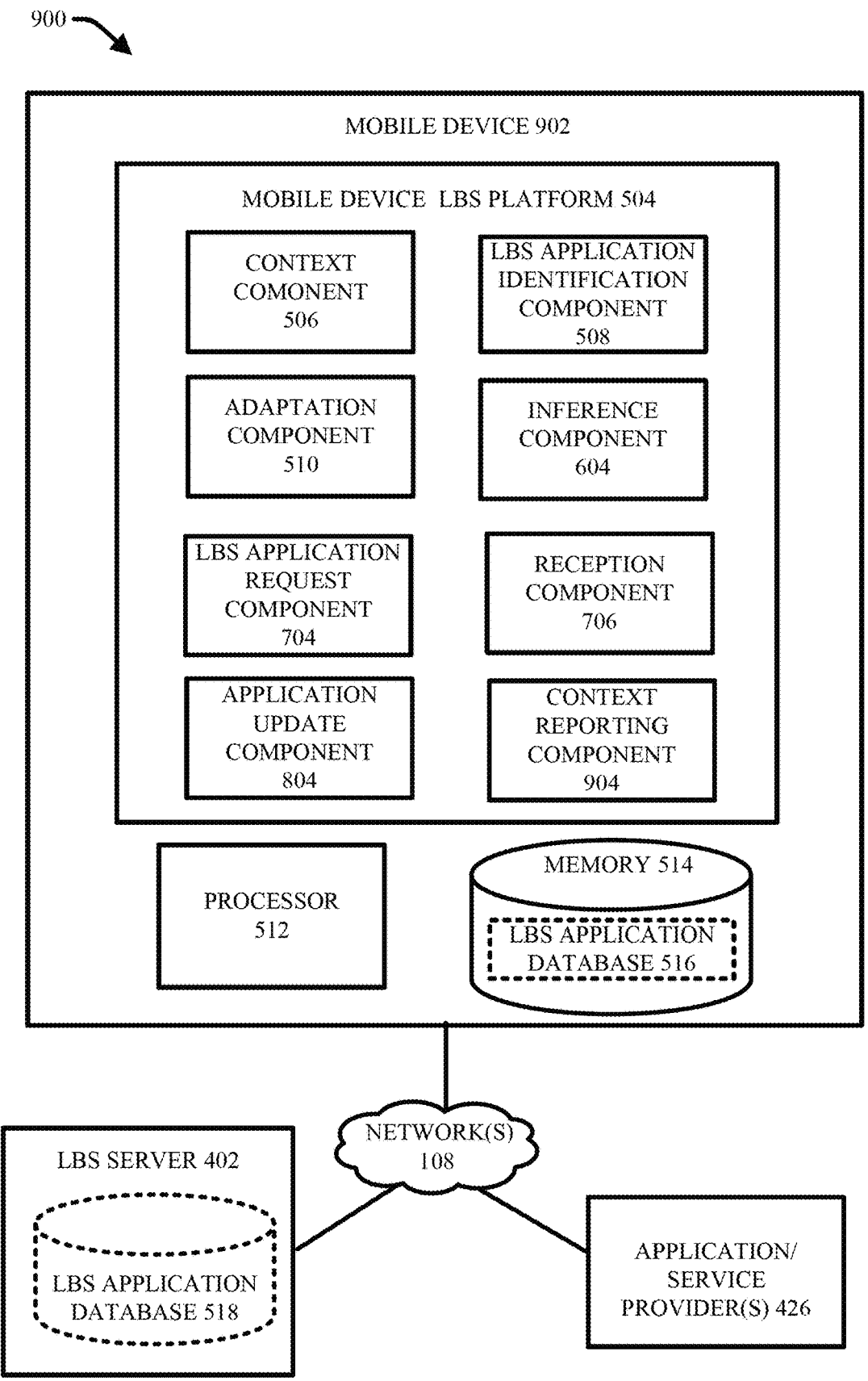
FIG. 9 illustrates another example device for autonomously pulling and displaying LBS applications by a mobile device based on context of the mobile device in accordance with various aspects and embodiments described herein.

FIG. 9 presents another diagram of a mobile device 902 configured to pull and display LBS applications based on context of the mobile device in accordance with various aspects and embodiments described herein. Mobile device 902 includes same or similar features and functionalities as mobile device 802 with the addition of context reporting component 904. Repetitive description of like elements employed in respective embodiments of systems and devices described herein are omitted for sake of brevity.

Mobile device LBS platform 504 can employ context reporting component 904 to send contextual information to LBS server 402 and/or application service provider(s) 426. For example, information gathered or determined by context component 506 regarding context of mobile device 902 can be automatically sent by context reporting component 904 to LBS server 402 for analysis and processing thereof in association with identifying LBS applications related to the context information for providing to mobile device 902.

Figure 10:
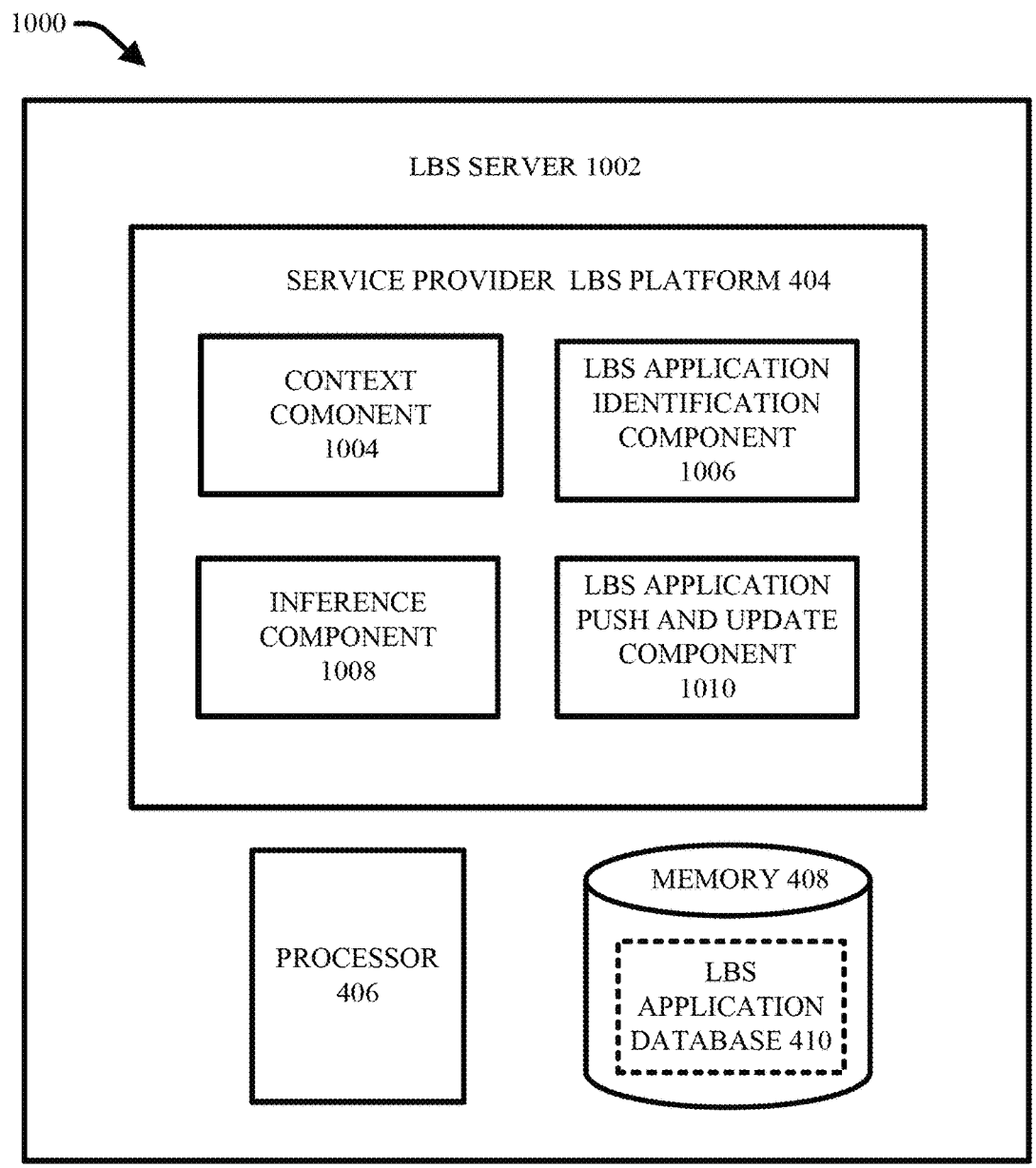
FIG. 10 illustrates an example server device for identifying and providing LBS applications to a mobile device based on context of the mobile device in accordance with various aspects and embodiments described herein.

FIG. 10 presents an example diagram of an LBS server 1002 configured to facilitate enhancing a user's experience with respect to LBS applications that can be employed by a user via a mobile device in accordance with various aspects and embodiments disclosed herein. LBS server 1002 can include same or similar features and functionalities as LBS server 402 and vice versa. Repetitive description of like elements employed in respective embodiments of systems and devices described herein are omitted for sake of brevity.

LBS server 1002 includes service provider LBS platform 404, processor 406 and memory 408. Service provider LBS platform 404 can include context component 1004, LBS application identification component 1006, inference component 1008 and LBS application push and update component 1010.

Context component 1004 is configured to receive information regarding a context of a mobile device and/or a user of the mobile device (e.g., mobile device 502-902 and the like) and/or determine a context of a mobile device and/or a user of the mobile device. For example, in various aspects, a mobile device can include processing capabilities (e.g., using context component 506) to determine or infer context information as described herein. The mobile device can further provide this context information to LBS server 402 that is received by context component 1004. In another aspect, context component 1004 can include same or similar features and functionalities of context component 506. According to this aspect, context component 1004 can receive or collect (e.g., from the mobile device and/or a remote networked source) information regarding a location of a mobile device (e.g., using various known mechanism to determine device location), user preferences, user schedule, time of day, mobile device mobility state, business operation hours, business type, and etc. and employ this information to determine or infer a current context of the mobile device/ user of the mobile device. Context component 1004 can also employ an inference component 1008 with same or similar functionality as inference component 604 to facilitate inferring a context of a mobile device/user of mobile device base on any received or collected information.

In an aspect, a mobile device can include an LBS application identification component 508 to identify LBS applications relevant to device/user context. In another aspect, LBS server can perform the identification of relevant LBS applications in LBS application database 410 using LBS application identification component 1006 based on context information received and/or determined by context component 1004. According to this aspect, LBS application identification component 1006 can include same or similar functionality as LBS application identification component 508. In addition, LBS application identification component 1006 can employ inference component 1008 with same or similar functionality as inference component 604 to facilitate inferring LBS applications provided in LBS application database 410 that are relevant to a current context of a mobile device/user of the mobile device.

LBS application push and update component 1010 is configured to push LBS applications identified by LBS application identification component 1006 to the mobile device. As a result, LBS server can automatically identify relevant LBS applications and provided them to a mobile device without involvement of a user of the mobile device. In addition, LBS application push and update component 1010 can automatically identify and push updates to LBS applications accessed by a mobile device that are relevant to a context under which they are accessed.

FIGS. 11-14 present an example implementation of systems and devices described herein in accordance with various aspects and embodiments. In particular, FIGS. 11-14 demonstrate an example use case scenario of systems and devices described herein in connection with a user of a mobile device having the features and functionalities described herein, traveling to a shopping center, visiting the shopping center, and leaving the shopping center with her mobile device in the course of an afternoon. As the context of the user changes in association with traveling to the shopping center, visiting the shopping center, and leaving the shopping center, applications presented to the user on a primary display screen of the user's mobile device dynamically adapt to include applications most relevant to a user's current context.

Figure 11:
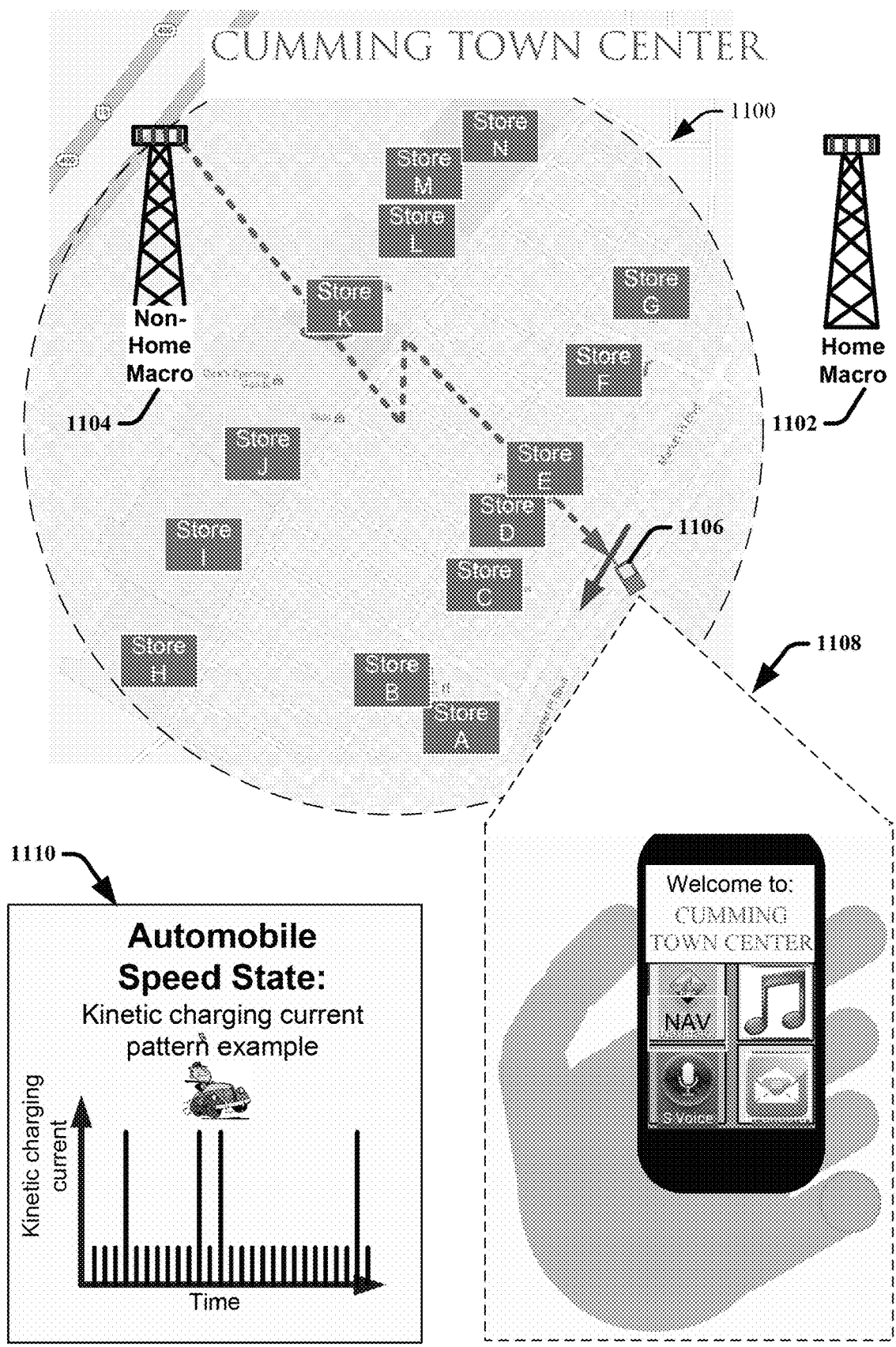
FIGS. 11-14 present an example implementation of systems and devices for enhancing a user's experience with respect to LBS applications that can be employed by a user via a mobile device in accordance with various aspects and embodiments described herein.

With reference now to FIG. 11, presented is a map of a geographical area located 1100 within the coverage of an eNB for a non-home macro cell 1104 with respect to a user of mobile device 1106. Geographical area 1100 includes an outdoor shopping center named "Cumming Town Center,"

that includes a plurality of stores labeled A-N. Call out box 1108 presents an enlarged view of a display screen of mobile device 1106. According to the example use case scenario embodied in FIG. 11, a user of mobile device has driven away from her home macro cell 1102 and is driving into the area 1100 associated with Cumming Town Center with her mobile device 1106. At a time before the user arrives at Cumming Town Center, applications are presented on her mobile device that relate to a context of the user prior to arriving at Cumming Town Center. For example, the applications depicted on the user's mobile device 1106 in call out box 1108 include a navigation application, a music application, a voice application and a mail application.

In an aspect, mobile device 1106 detects a speed state of in association with decoupling from accessing the home macro cell 1102 and the non-home macro cell 1104. For example, mobile device 1106 can analyze a kinetic charging current pattern as pictured in association with graph 1110 to determine that mobile device is 1106 is in an automobile speed state. In response to connecting to the non-home macro cell 1104 and detecting that the user is driving into area 1100 covered by the non-home macro cell, mobile device 1106 can look up a PCI for the non-home macro cell in an LBS application database and identify one or more physical entities associated with area 1100 that are also associated with LBS applications.

In an aspect, where a PCI is associated with a plurality of different entities and respective applications for the entities in the LBS application database, the mobile device can employ locating mechanisms to identify a more granular location associated with mobile device 1106 within area 1100 (e.g., as opposed to a general coverage area associated with a macro cell). For example, the mobile device 1106 can activate GPS to determine which entities (e.g., shopping centers), the mobile device is closest to within a PCI coverage area. In another aspect, if a PCI is associated with a one or a few physical entities (e.g., only one shopping center), than no GPS is required.

In response to identifying Cumming Town Center as being associated with a PCI for non-home macro cell 1104, mobile device 1106 can display a graphical icon to the user of mobile device 1106 indicating that the user is arriving at or near Cumming Town Center. In an aspect, also in response to identifying Cumming Town Center as being associated with a PCI for non-home macro cell 1104, before the user of mobile device 1106 stops and parks her car at Cumming Town Center, mobile device 1106 can search for and download all LBS shopping applications (if available and not already provided on mobile device 1106) for stores A-N associated with Cumming Town Center.

Figure 12:
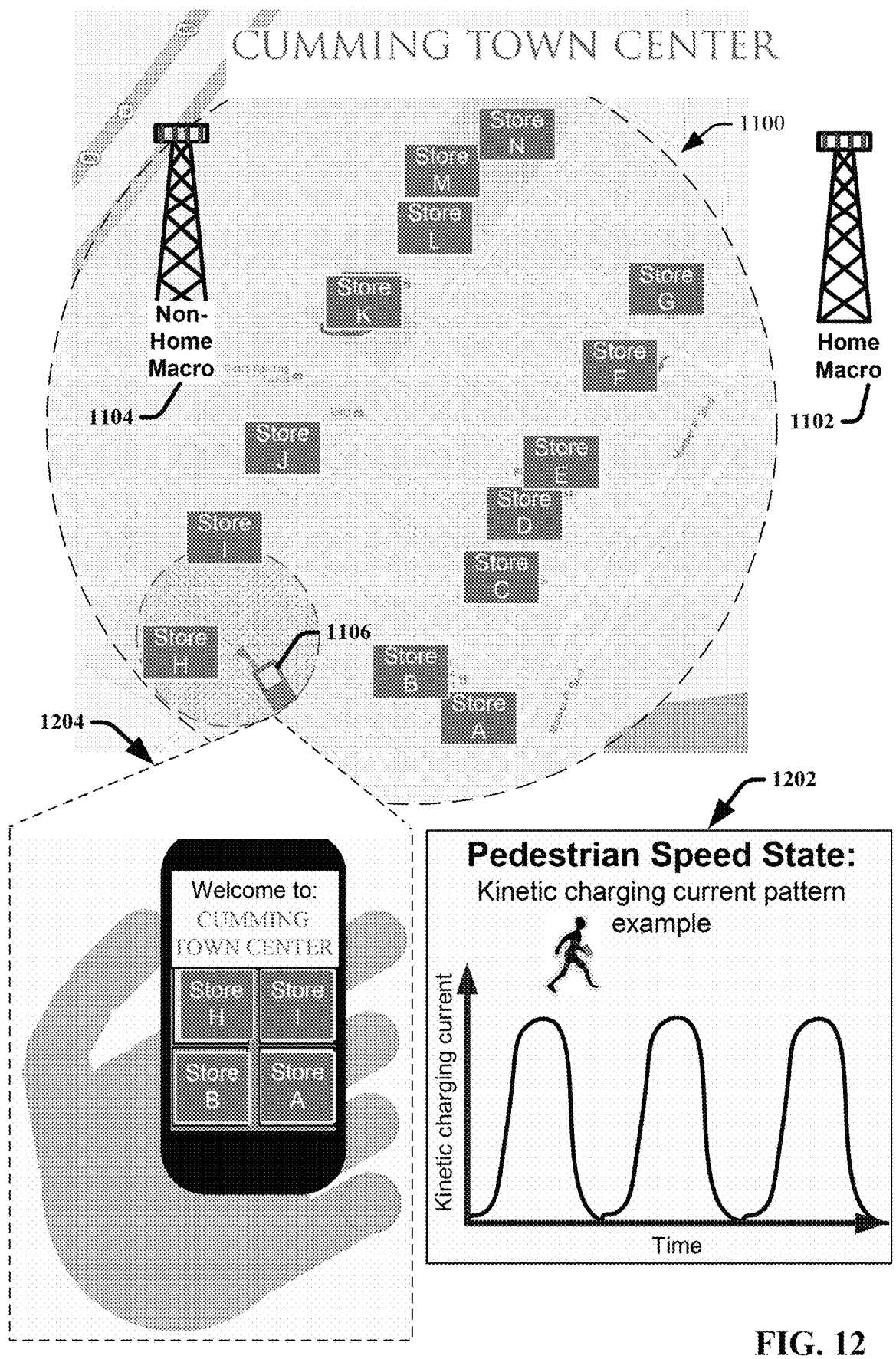

Turning next to FIG. 12, in continuance with the example use case described in FIG. 11, FIG. 12 depicts an example scenario where the user of mobile device 1106 has parked at Cumming Town Center and is walking around Cumming Town Center shopping with her mobile phone. As shown by graph 1202, mobile device 1106 has detected that the mobility state of mobile device has changed from driving to walking. In response to this change in mobility state, mobile device 1106 can look for nearby radio identifiers (e.g., Wi-Fi access point, femto access points, etc.) associated with stores at Cumming Town Center, and/or active GPS to identify a more precise location of the mobile device. Mobile device 1106 can then look up which stores are closest to the location of the mobile device 1106 using information in an LBS application database (e.g., LBS application database 410 or 422 and the like). In an aspect, mobile device 1106 can also employ multilateration and/or triangulation mechanisms to precisely identify where the mobile device is located and which stores of stores A-N are closest to mobile device 1106 a current point in time.

Mobile device 1106 can then rank the stores A-N from closest to furthest to the mobile device 1106 at a point in time and place graphical icons for the shopping applications associated with the respective stores that are closest to the mobile device device at a certain point in time on a primary display screen of the mobile. For example, as seen in call out box 1204, the display screen of mobile device 1106 includes graphical icons for stores I, B, H and A which are the four closest stores to mobile device 1106 as shown in FIG. 12. In an aspect, mobile device 1106 can arrange the icons for the LBS application of the respective stores I, B, H, and A to reflect which stores are closest to the mobile. For example, mobile device 1106 can place the furthest store icon furthest from the thumb or on a secondary home screen.

Figure 13:
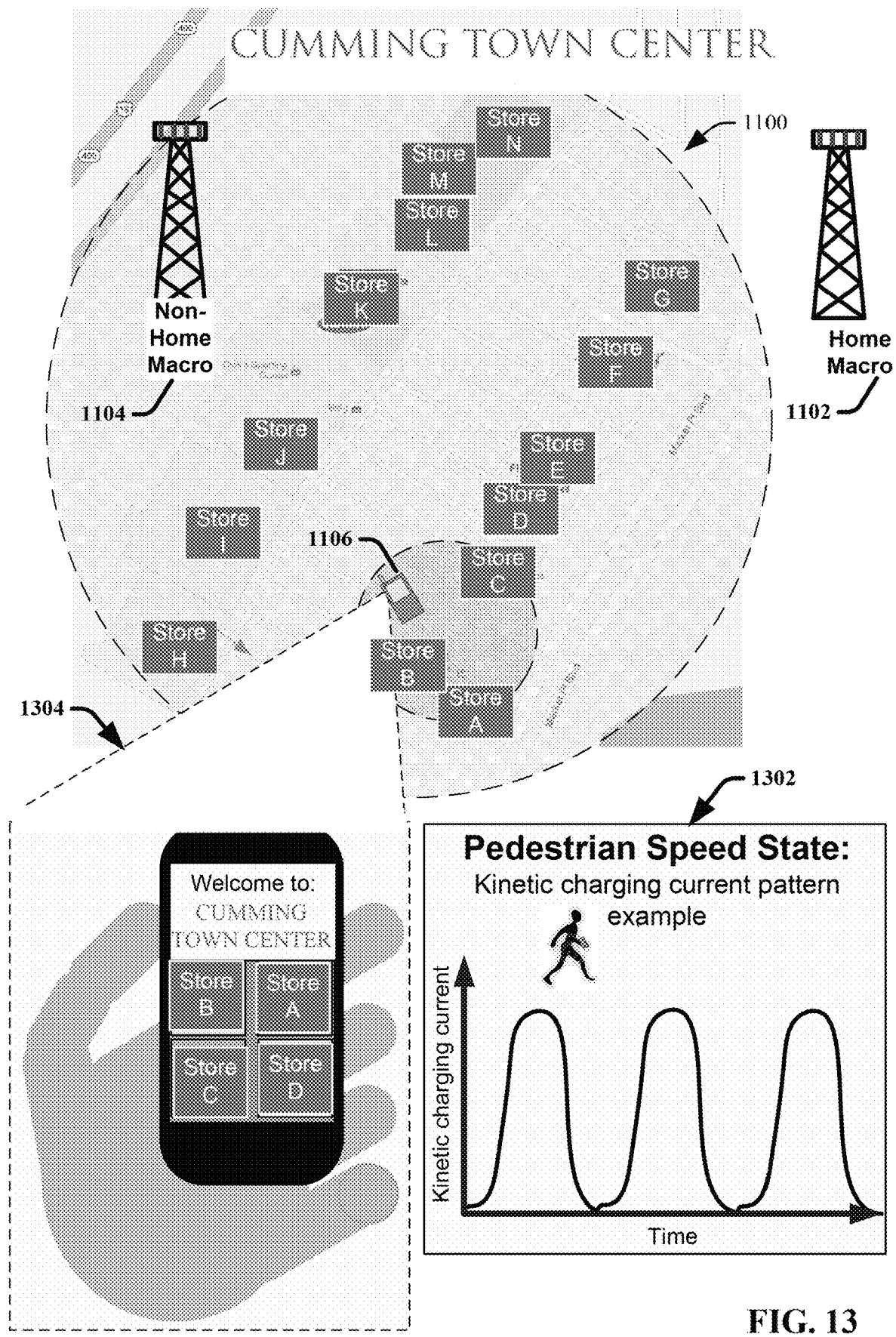

Turning next to FIG. 13, in continuance with the example use case described in FIG. 12, FIG. 13 depicts an example scenario where the user of mobile device 1106 has continued shopping and walking around Cumming Town Center shopping with her mobile phone. As shown by graph 1302, mobile device 1106 has detected that the mobility state of mobile device is walking. For example, mobile device 1106 can detect a change in mobility state from stationary to walking. In response to this detected mobility state, mobile device 1106 can look for nearby radio identifiers (e.g., Wi-Fi access point, femto access points, etc.) associated with stores at Cumming Town Center, and/or active GPS to identify a more precise location of the mobile device. In an aspect, mobile device 1106 can also detect a loss or change in nearby radio access point signals or activate GPS when the user's speed state changes from stationary to moving to facilitate identifying a location of mobile device 1106.

Mobile device 1106 can then look up which stores are closest to the location of the mobile device 1106 using information in an LBS application database (e.g., LBS application database 410 or 422 and the like) is a similar manner described with respect to FIG. 12 (e.g., using triangulation, multilateration, or other known locating mechanisms). Mobile device 1106 can then re-rank the stores A-N from closest to furthest to the mobile device 1106 at the current point in time and place graphical icons for the shopping applications associated with the respective stores that are closest to the mobile device at a certain point in time on a primary display screen of the mobile. For example, as seen in call out box 1304, the display screen of mobile device 1106 has been adapted to now include graphical icons for stores B, A, C, and D as opposed to stores I, B, H and A. Also, because store B is the closes to mobile device 1106, store B can be arranged in a location of the display screen closest to the user's thumb.

Figure 14:
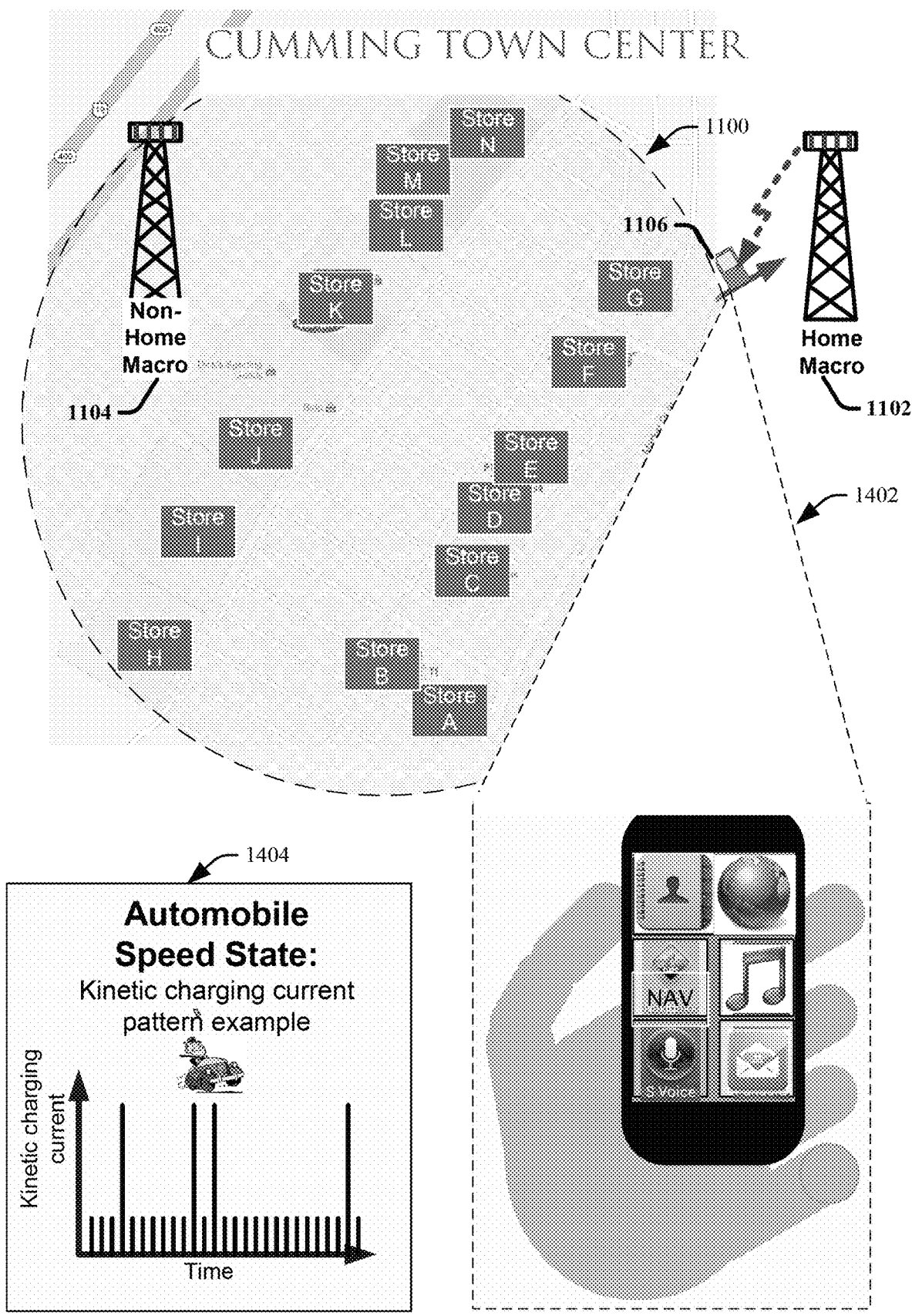

FIG. 14 in continuance of the example use case described in FIG. 13. In FIG. 14, the user of mobile device 1106 has finished shopping at Cumming Town Center and is driving away from Cumming town center to her home, as indicated by connection of mobile device 1106 with the home macro cell 1102. As shown by graph 1404, mobile device 1106 has detected that the mobility state of mobile device has changed from walking or stationary to driving. In response to this detected mobility state, mobile device 1106 can look for nearby radio identifiers (e.g., Wi-Fi access point, femto access points, etc.) associated with mobile device 1106 and/or access points which the mobile device is paired to determine a location and context of mobile device 1106. For example, mobile device can detect a loss of connection with non-home macro cell 1104 and a new connection with home macro cell 1102. In another example, mobile device 1106 can detect a connection of mobile device 1106 with a Bluetooth Device™ in the user's car to determine that the user is now driving in her car and thus leaving Cumming Town Center. In response to the change in location and context of mobile device 1106 from shopping at Cumming Town Center by foot to driving away from Cumming Town Center towards home, mobile device can identify new applications (LBS applications and/or non-LBS applications that are relevant to the user's current context. For example, as seen in call out box 1402, the graphical icons presented on a home screen of mobile device 1106 include icons representative of applications unrelated to Cumming Town Center.

In view of the example systems and/or devices described herein, example methods that can be implemented in accordance with the disclosed subject matter can be further appreciated with reference to flowcharts in FIGS. 15-18. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 15:
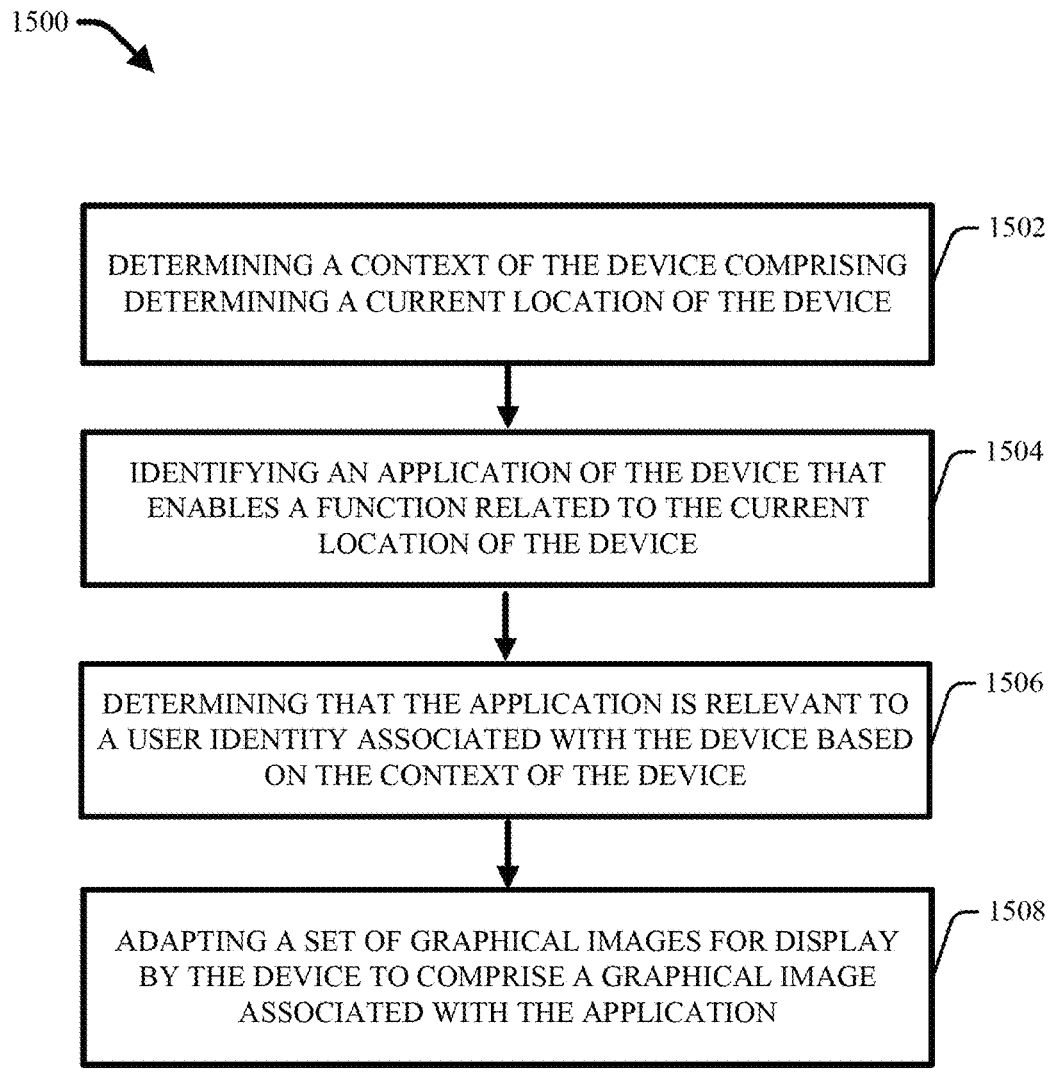
FIG. 15 is a flow diagram of an example method for autonomously pulling and displaying LBS applications by a mobile device based on context of the mobile device in accordance with various aspects and embodiments described herein.

FIG. 15 illustrates a flow chart of an example method 1500 for autonomously pulling and displaying location based services applications by a mobile device based on context of the mobile device in accordance with aspects described herein. At 1502 a context of a device is determined, including determining a current location of the device (e.g., using context component 506). At 1504, an application of the device that enables a function related to the current location of the device is identified (e.g., using LBS application identification component 508). At 1506, it is determined that the application is relevant to a user identity associated with the device based on the context of the device (e.g., using LBS application identification component 508 and/or inference component 604). At 1508, a set of graphical images is adapted for display by the device to comprise a graphical image associated with the application (e.g., using adaptation component 510).

Figure 16:
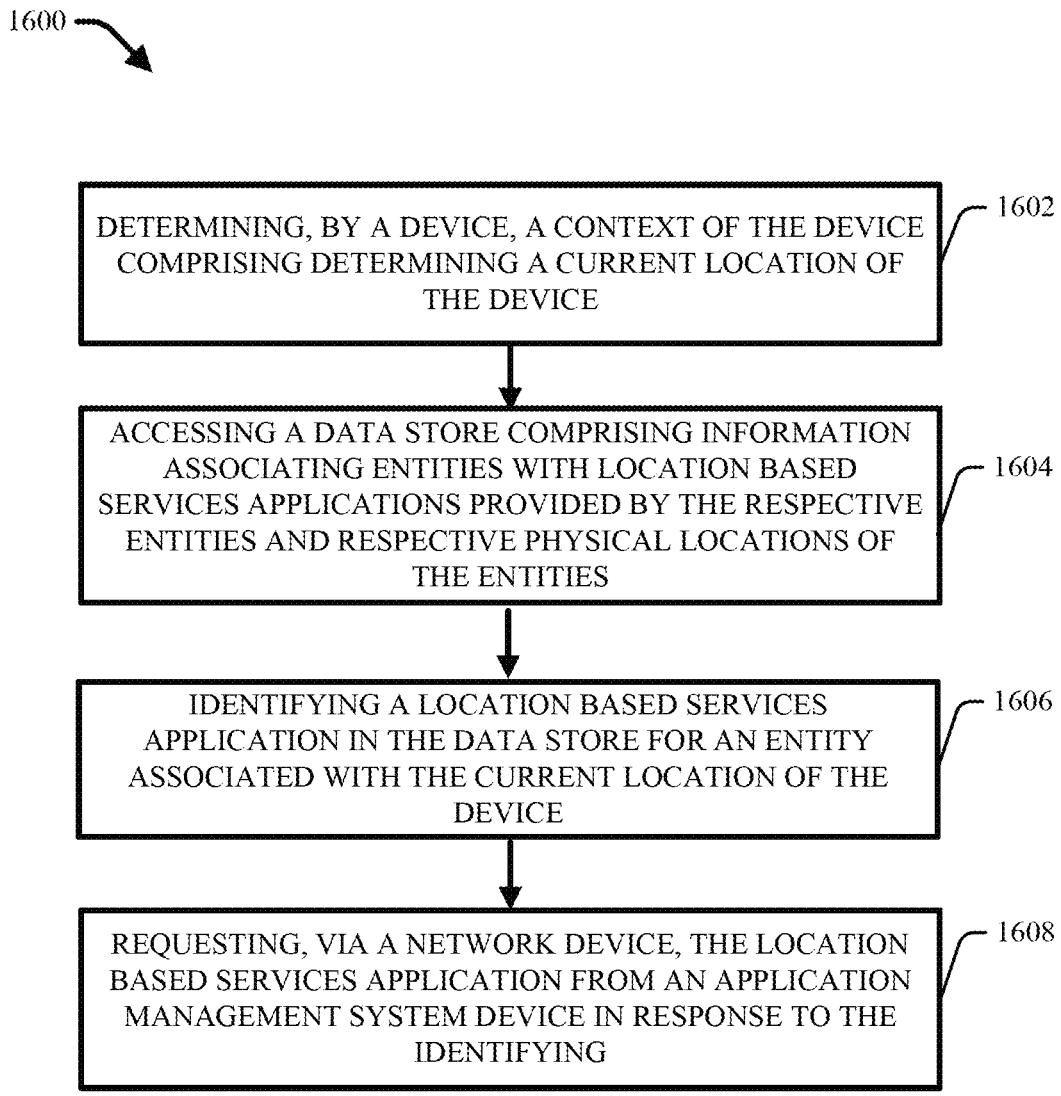
FIG. 16 is a flow diagram of another example method for autonomously pulling and displaying LBS applications by a mobile device based on context of the mobile device in accordance with various aspects and embodiments described herein.

FIG. 16 illustrates a flow chart of another example method 1600 for autonomously pulling and displaying location based services applications by a mobile device based on context of the mobile device in accordance with aspects described herein. At 1602, a device determines a context of the device comprising, including determining a current location of the device (e.g., using context component 506). At 1604, the device accesses a data store comprising information associating entities with location based services applications provided by the respective entities and respective physical locations of the entities (e.g., using LBS application identification component 508). At 1606 a location based services application is identified in the data store for an entity associated with the current location of the device (e.g., using LBS application identification component 508). Then at 1608, the location based services application is requested from an application management system device in response to the identifying (e.g., using LBS application request component 704).

Figure 17:
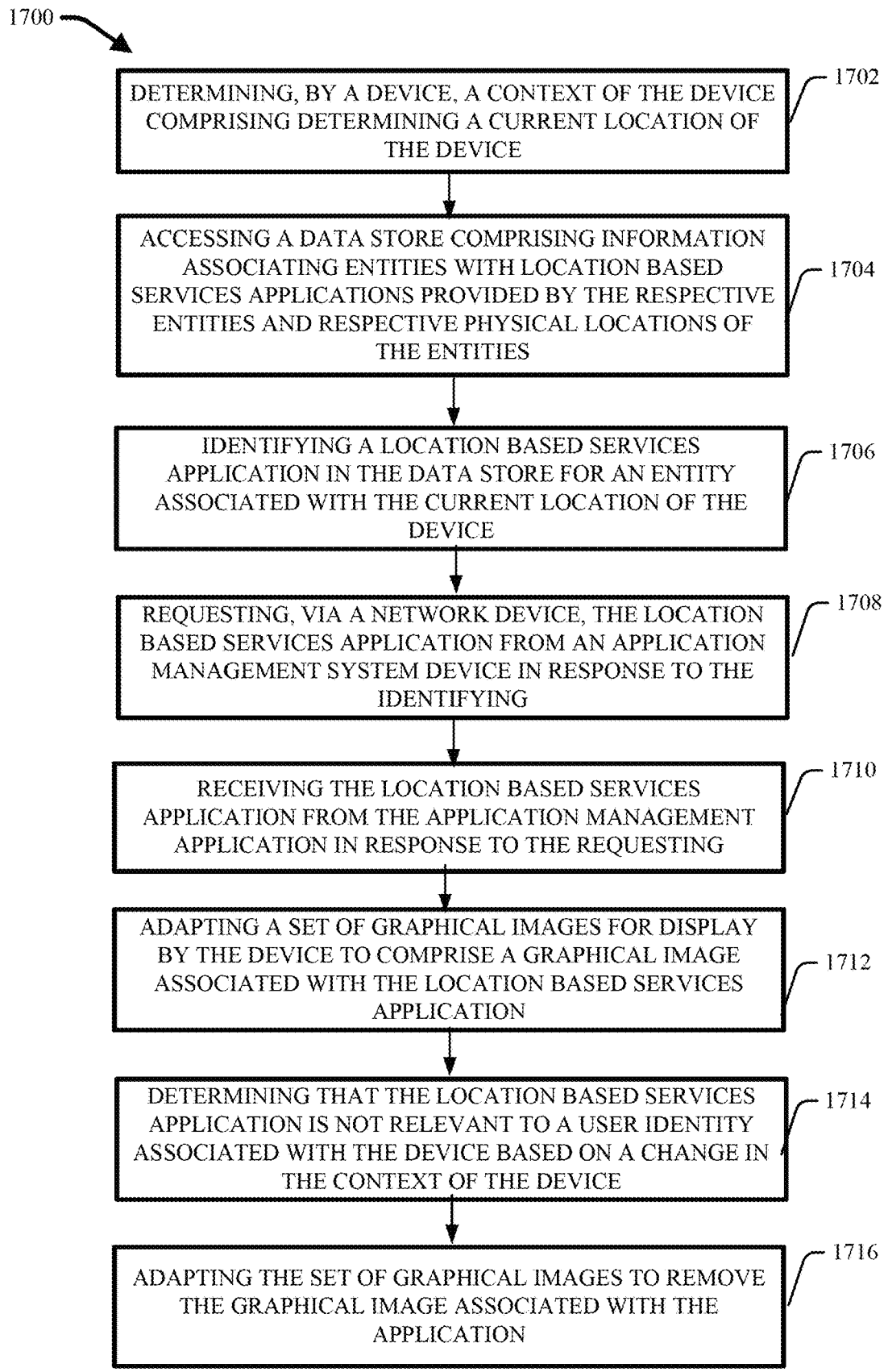
FIG. 17 is a flow diagram of another example for autonomously pulling and displaying LBS applications by a mobile device based on context of the mobile device in accordance with various aspects and embodiments described herein.

FIG. 17 illustrates a flow chart of another example method 1700 for autonomously pulling and displaying location based services applications by a mobile device based on context of the mobile device in accordance with aspects described herein. At 1702, a device determines a context of the device comprising, including determining a current location of the device (e.g., using context component 506). At 1704, the device accesses a data store comprising information associating entities with location based services applications provided by the respective entities and respective physical locations of the entities (e.g., using LBS application identification component 508). At 1706 a location based services application is identified in the data store for an entity associated with the current location of the device (e.g., using LBS application identification component 508). Then at 1708, the location based services application is requested from an application management system device in response to the identifying (e.g., using LBS application request component 704).

At 1710, the location based services application is received from the application management device in response to the requesting. At 1712, a set of graphical images is adapted for display by the device to comprise graphical images for display by the device is adapted to comprise graphical images associated with the location based services application. At 1714, it is determined that the location based services application is not relevant to a user identify associated with the device based on a change in the context of the device. Then at 1716, the set of graphical images is adapted to remove the graphical image associated with the application.

Figure 18:
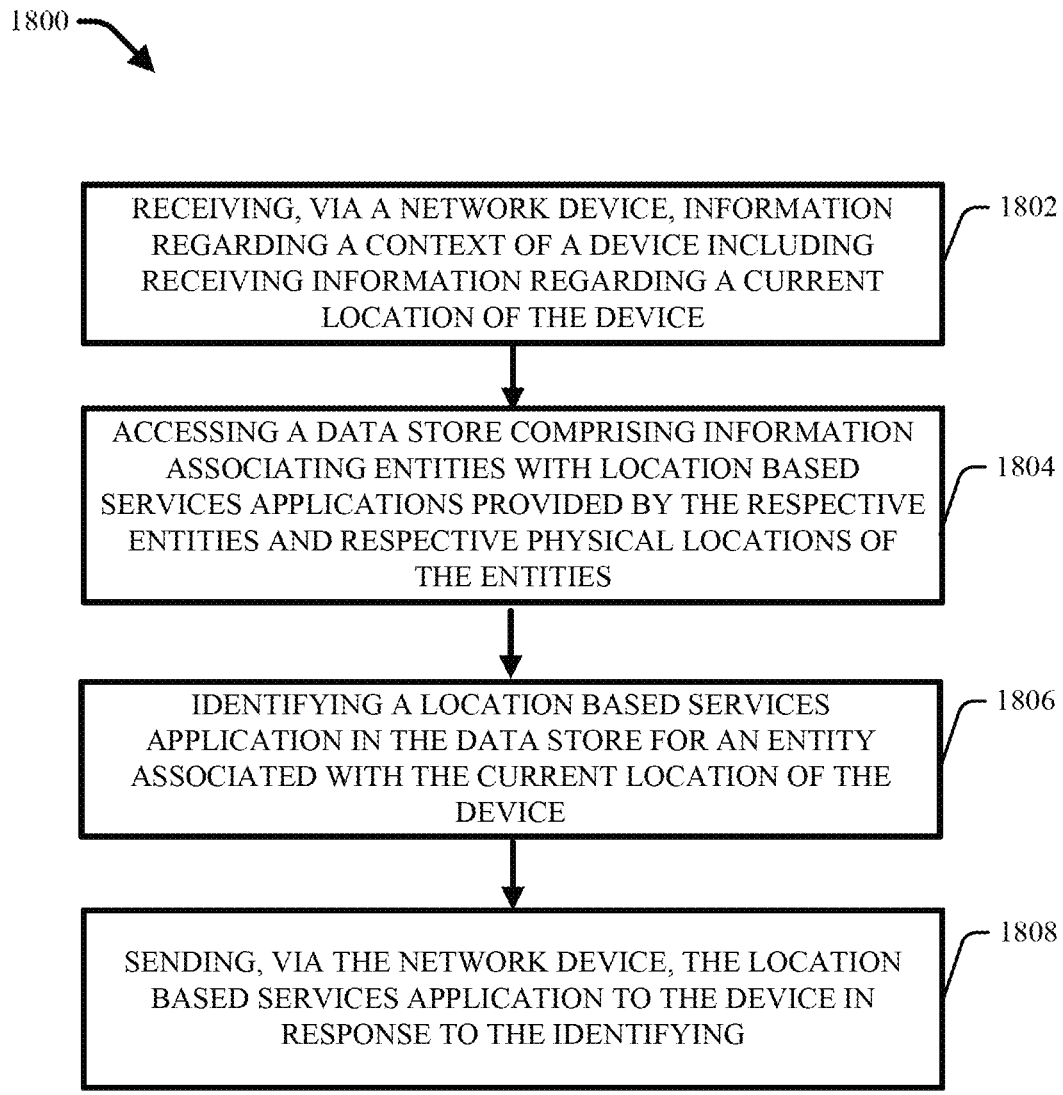
FIG. 18 is a flow diagram of another example for autonomously pushing LBS applications to a mobile device based on context of the mobile device in accordance with various aspects and embodiments described herein.

FIG. 18 presents a flow chart of an example method 1800 for automatically identifying and providing LBS applications to a mobile device base on a context of the mobile device in accordance with various aspects and embodiments described herein. At 1802 information regarding a context of a device (e.g., mobile devices 502-902 and the like) is received at a network device (e.g., LBS server 1002), including receiving information regarding a current location of the device (e.g., via context component 1004). At 1804, a data store comprising information associating entities with location based services applications provided by the respective entities and respective physical locations of the entities is accessed by the network device (e.g., using LBS application identification component 1006). At 1806, a location based services application in the data store is identified for an entity associated with the current location of the device (e.g., using LBS application identification component 1006 and/or inference component 1008). Then, at 1810, the location based services application is sent to the device in response to the identifying via the network device (e.g., using LBS application push and update component 1012).

The subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., smartphone, PDA, electronic tablets or pads, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Figure 19:
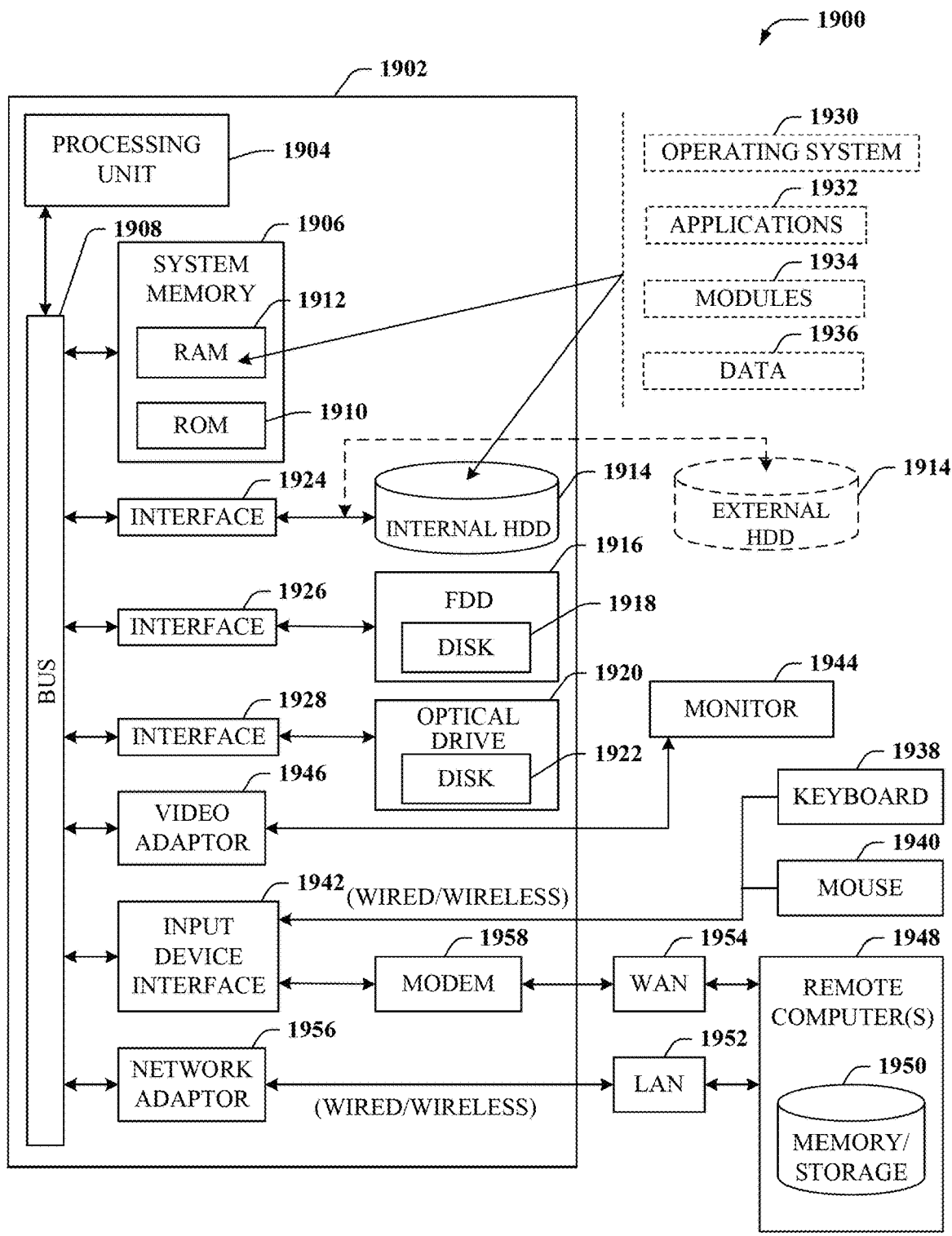
FIG. 19 is a schematic block diagram illustrating a suitable operating environment in accordance with various aspects and embodiments.

Referring now to FIG. 19, there is illustrated a block diagram of a computing environment in accordance with various aspects described herein. For example, in some embodiments, the computer can be or be included within the distributed antenna system disclosed in any of the previous systems 100 and 400.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), which internal hard disk drive 1914 can also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and Institute of Electrical and Electronics Engineers (IEEE) 19194 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) can include a microphone, an infrared (IR) remote control, a joystick, a game pad, a stylus pen, touch screen or the like. These and other input devices are often connected to the processing unit 1904 through an input device interface 1942 that can be coupled to the system bus 1908, but can be connected by other interfaces, such as a parallel port, an IEEE 13194 serial port, a game port, a universal serial bus (USB) port, an IR interface, etc.

A monitor 1944 or other type of display device can be also connected to the system bus 1908 via an interface, such as a video adapter 1946. In addition to the monitor 1944, a computer typically includes other peripheral output devices (not shown), such as speakers, printers, etc.

The computer 1902 can operate in a networked environment using logical connections via wired and/or wireless communications to one or more remote computers, such as a remote computer(s) 1948. The remote computer(s) 1948 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1952 through a wired and/or wireless communication network interface or adapter 1956. The adapter 1956 can facilitate wired or wireless communication to the LAN 1952, which can also include a wireless AP disposed thereon for communicating with the wireless adapter 1956.

When used in a WAN networking environment, the computer 1902 can include a modem 1958 or can be connected to a communications server on the WAN 1954 or has other means for establishing communications over the WAN 1954, such as by way of the Internet. The modem 1958, which can be internal or external and a wired or wireless device, can be connected to the system bus 1908 via the input device interface 1942. In a networked environment, program modules depicted relative to the computer 1902 or portions thereof, can be stored in the remote memory/storage device 1950. It will be appreciated that the network connections shown are example and other means of establishing a communications link between the computers can be used.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 20:
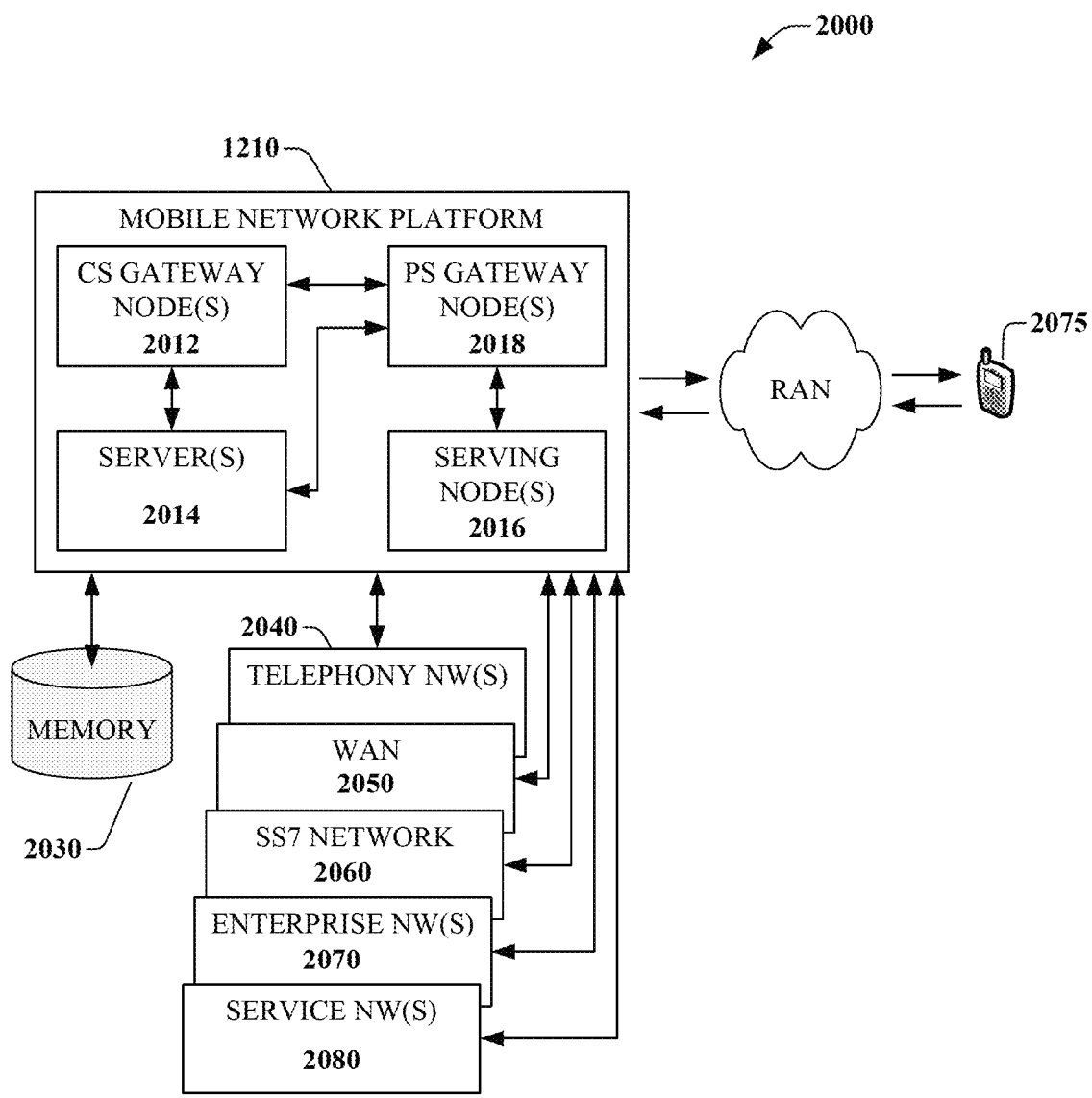
FIG. 20 is a schematic block diagram of a sample-computing environment in accordance with various aspects and embodiments.

FIG. 20 presents an example embodiment 2000 of a mobile network platform 2010 that can implement and exploit one or more aspects of the disclosed subject matter described herein. Generally, wireless network platform 2010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 2010 can be included in telecommunications carrier networks, and can be considered carrier-side components as discussed elsewhere herein. Mobile network platform 2010 includes CS gateway node(s) 2012 which can interface CS traffic received from legacy networks like telephony network(s) 2040 (e.g., public switched telephone network (PSTN), or public land mobile network (PLMN)) or a signaling system #7 (SS7) network 2070. Circuit switched gateway node(s) 2012 can authorize and authenticate traffic (e.g., voice) arising from such networks. Additionally, CS gateway node(s) 2012 can access mobility, or roaming, data generated through SS7 network 2070; for instance, mobility data stored in a visited location register (VLR), which can reside in memory 2030. Moreover, CS gateway node(s) 2012 interfaces CS-based traffic and signaling and PS gateway node(s) 2018. As an example, in a 3GPP UMTS network, CS gateway node(s) 2012 can be realized at least in part in gateway GPRS support node(s) (GGSN). It should be appreciated that functionality and specific operation of CS gateway node(s) 2012, PS gateway node(s) 2018, and serving node(s) 2016, is provided and dictated by radio technology(ies) utilized by mobile network platform 2010 for telecommunication.

In addition to receiving and processing CS-switched traffic and signaling, PS gateway node(s) 2018 can authorize and authenticate PS-based data sessions with served mobile devices. Data sessions can include traffic, or content(s), exchanged with networks external to the wireless network platform 2010, like wide area network(s) (WANs) 2050, enterprise network(s) 2070, and service network(s) 2080, which can be embodied in local area network(s) (LANs), can also be interfaced with mobile network platform 2010 through PS gateway node(s) 2018. It is to be noted that WANs 2050 and enterprise network(s) 2060 can embody, at least in part, a service network(s) like IP multimedia subsystem (IMS). Based on radio technology layer(s) available in technology resource(s) 2017, packet-switched gateway node(s) 2018 can generate packet data protocol contexts when a data session is established; other data structures that facilitate routing of packetized data also can be generated. To that end, in an aspect, PS gateway node(s) 2018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 2000, wireless network platform 2010 also includes serving node(s) 2016 that, based upon available radio technology layer(s) within technology resource(s) 2017, convey the various packetized flows of data streams received through PS gateway node(s) 2018. It is to be noted that for technology resource(s) 2017 that rely primarily on CS communication, server node(s) can deliver traffic without reliance on PS gateway node(s) 2018; for example, server node(s) can embody at least in part a mobile switching center. As an example, in a 3GPP UMTS network, serving node(s) 2016 can be embodied in serving GPRS support node(s) (SGSN).

For radio technologies that exploit packetized communication, server(s) 2014 in wireless network platform 2010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 2010. Data streams (e.g., content(s) that are part of a voice call or data session) can be conveyed to PS gateway node(s) 2018 for authorization/authentication and initiation of a data session, and to serving node(s) 2016 for communication thereafter. In addition to application server, server(s) 2014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 2010 to ensure network's operation and data integrity in addition to authorization and authentication procedures that CS gateway node(s) 2012 and PS gateway node(s) 2018 can enact. Moreover, provisioning server(s) can provision services from external network(s) like networks operated by a disparate service provider; for instance, WAN 2050 or Global Positioning System (GPS) network(s) (not shown). Provisioning server(s) can also provision coverage through networks associated to wireless network platform 2010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 2075.

It is to be noted that server(s) 2014 can include one or more processors configured to confer at least in part the functionality of macro network platform 2010. To that end, the one or more processor can execute code instructions stored in memory 2030, for example. It is should be appreciated that server(s) 2014 can include a content manager 2015, which operates in substantially the same manner as described hereinbefore.

In example embodiment 2000, memory 2030 can store information related to operation of wireless network platform 2010. Other operational information can include provisioning information of mobile devices served through wireless platform network 2010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 2030 can also store information from at least one of telephony network(s) 2040, WAN 2050, enterprise network(s) 2060, or SS7 network 2070. In an aspect, memory 2030 can be, for example, accessed as part of a data store component or as a remotely connected memory store.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 2020 (see below), non-volatile memory 2022 (see below), disk storage 2024 (see below), and memory storage 2046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
   a processor; and
   a memory that stores executable instructions that, when executed by the processor, facilitate performance of operations, comprising:
   determining context data indicative of a context of the mobile device, wherein determining the context data comprises:
   determining location data indicative of a current location of the mobile device, mobility state data indicative of a mobility state of the mobile device, and time data indicative of a current time, and
   predicting a destination location where the mobile device is headed based on the location data, the mobility state data, and directional movement data regarding a direction of movement of the mobile device;
   identifying a first application associated with a defined degree of relevance to the context of the mobile device based on the context data;
   adapting graphical elements of a home graphical user interface displayed at the mobile device to comprise a shortcut icon for the first application based on the defined degree of relevance, wherein the adapting comprises displaying the shortcut icon at a first position in the home graphical user interface determined to facilitate a more efficient selection of the shortcut icon relative to a second position in the home graphical user interface when the mobile device is handheld and operated under the mobility state;
   sending the context data to an application server associated with the first application; and
   in response to the sending, receiving an update for the first application determined based on the context data;
   identifying a second application in an application datastore that is relevant to the destination location and not stored in the memory of the mobile device; and
   downloading the second application prior to arrival of the mobile device at the destination location based on the identifying the second application.

2. The mobile device of claim 1, wherein the displaying is further based on a determination that the first position facilitates the more efficient selection of the shortcut icon relative to the second position when the mobile device is handheld based on a dimension of a display screen of the mobile device on which the home graphical user interface is displayed.

3. The mobile device of claim 1, wherein determining the context data further comprises determining event data regarding an event associated with the current location of the mobile device.

4. The mobile device of claim 1, wherein determining the context data further comprises identifying a place of business associated with the current location and determining hours of operation of the place of business, and wherein determining the degree of relevance is based on whether the place of business is open for operation at the current time.

5. The mobile device of claim 1, wherein displaying the shortcut icon at the first position is further based on a determination that the first position facilitates the more efficient selection of the shortcut icon relative to the second position when the mobile device is handheld based on dexterity data representative of a dexterity of an entity associated with the mobile device.

6. The mobile device of claim 1, wherein identifying the first application comprises employing implicitly trained classifiers that were trained based on historical application usage data in association with historical context data.

7. The mobile device of claim 1, wherein identifying the first application comprises employing explicitly trained classifiers that were trained based on previously generated training data.

8. The mobile device of claim 1, wherein identifying the first application comprises employing classifiers that were trained in association with a training phase within a classifier constructor and feature selection module to determine applications that are relevant to different contexts of the mobile device.

9. The mobile device of claim 8, wherein the different contexts are based on a combination of attributes including location attributes regarding locations of the mobile device, mobility state attributes regarding mobility states of the mobile device, and time attributes regarding time and day.

10. The mobile device of claim 1, wherein identifying the first application comprises identifying the first application based on whether the first application satisfies a rule for use in association with the mobility state.

11. The mobile device of claim 10, wherein the mobility state is selected from a group consisting of a stationary mobility state, a walking mobility state, and a driving mobility state.

12. The mobile device of claim 1, wherein determining the location data comprises activating a global positioning system component of the mobile device and employing the global positioning system component to determine the location data in response to a first change in mobility state of the mobile device from a stationary mobility state to a non-stationary mobility state.

13. The mobile device of claim 12, wherein the operations further comprise:
   deactivating the global positioning system component in response to a second change in the mobility state of the mobile device from the non-stationary mobility state to the stationary mobility state.

14. A method, comprising:
   determining, by a mobile device comprising a processor, context data indicative of a change in a context of the mobile device from a first context to a second context, wherein determining the context data comprises:

determining a change in a location of the mobile device from a first location to a second location, determining a mobility state of the mobile device and determining a current time of operation of the mobile device, and predicting a destination location where the mobile device is headed based on the location data, the mobility state data, and directional movement data regarding a direction of movement of the mobile device;

in response to determining the context data, identifying by the mobile device a first application associated with a defined degree of relevance to the second context of the mobile device based on the context data;

adapting, by the mobile device, graphical elements of a home graphical user interface displayed at the mobile device to comprise a shortcut icon for the first application based on the defined degree of relevance, wherein the adapting comprises displaying the shortcut icon at a first position in the home graphical user interface determined to facilitate a more efficient selection of the shortcut icon relative to a second position in the home graphical user interface when the mobile device is held and operated under the mobility state;

providing the context data to an application server associated with the first application;

based on the providing, receiving an update for the first application determined based on the context data;

identifying a second application in an application datastore that is relevant to the destination location and not stored in the memory of the mobile device; and downloading the second application prior to arrival of the mobile device at the destination location based on the identifying the second application.

15. The method of claim 14, wherein the displaying is further based on a determination that the first position facilitates the more efficient selection of the shortcut icon relative to the second position when the mobile device is handheld based on a dimension of a display screen of the mobile device on which the home graphical user interface is displayed.

16. The method of claim 14, wherein determining the context data further comprises identifying a place of business associated with the second location and determining hours of operation of the place of business, and wherein determining the degree of relevance is based on whether the place of business is open for operation at the current time.

17. A non-transitory readable storage medium, comprising executable instructions that, when executed by a processor of a mobile device, facilitate performance of operations, comprising:

determining context data indicative of a change in a context of the mobile device from a first context to a second context, wherein determining the context data comprises:

determining a change in a location of mobile device from a first location to a second location, determining a mobility state of the mobile device and determining a current time of operation of the mobile device, and predicting a destination location where the mobile device is headed based on the change in the location, the mobility state data, and directional movement data regarding a direction of movement of the mobile device;

inferring, based on the context data, that a first application comprising a first shortcut icon displayed at a first position in a home graphical user interface of the mobile device has less relevance to the second context than to the first context;

identifying, based on the context data, a second application that has more relevance to the second context than the first application;

adapting graphical elements of the home graphical user interface to comprise a second shortcut icon for the second application at the first position;

facilitating transmitting the context data to an application server associated with the second application based on the identifying;

based on the transmitting, receiving an update for the second application determined based on the context data;

identifying a third application in an application datastore that is relevant to the destination location and not stored in the memory of the mobile device; and downloading the third application prior to arrival of the mobile device at the destination location based on the identifying the third application.

18. The non-transitory readable storage medium of claim 17, wherein determining the context data further comprises identifying user devices located within a defined proximity to the mobile device and entities associated with the user devices.

19. The non-transitory readable storage medium of claim 17, wherein determining the context data further comprises determining event data regarding an event associated with the second location.

20. The non-transitory readable storage medium of claim 17, wherein determining the context data further comprises identifying a place of business associated with the second location and determining hours of operation of the place of business.

* * * * *